United States Patent [19]
Rope et al.

[11] Patent Number: 5,815,482
[45] Date of Patent: Sep. 29, 1998

[54] MULTIBYTE RANDOM ACCESS MASS STORAGE/MEMORY SYSTEM

[75] Inventors: Ronald E. Rope, Denver; Martin L. Pullam, Littleton, both of Colo.

[73] Assignee: T Squared G, Inc., Denver, Colo.

[21] Appl. No.: 589,560

[22] Filed: Jan. 22, 1996

[51] Int. Cl.⁶ .................................................. G11B 7/12
[52] U.S. Cl. .................... 369/112; 369/44.14; 369/44.37
[58] Field of Search ............................. 369/95, 112, 110, 369/109, 103, 44.27, 44.21, 44.32, 44.37, 44.14

[56] References Cited

U.S. PATENT DOCUMENTS

| | | |
|---|---|---|
| 3,885,094 | 5/1975 | Russell . |
| 3,975,630 | 8/1976 | Zorn . |
| 4,004,081 | 1/1977 | Zorn . |
| 4,009,492 | 2/1977 | Kihara et al. . |
| 4,024,513 | 5/1977 | Huignard et al. . |
| 4,074,085 | 2/1978 | Russell . |
| 4,090,031 | 5/1978 | Russell . |
| 4,129,384 | 12/1978 | Walker . |
| 4,163,600 | 8/1979 | Russell . |
| 4,219,704 | 8/1980 | Russell . |
| 4,265,213 | 5/1981 | Gorsuch et al. . |
| 4,269,917 | 5/1981 | Drexler et al. . |
| 4,321,700 | 3/1982 | Russell . |
| 4,395,372 | 7/1983 | Drexler . |
| 4,444,470 | 4/1984 | Ioka et al. . |
| 4,450,553 | 5/1984 | Holster et al. . |
| 4,495,609 | 1/1985 | Russell . |
| 4,500,777 | 2/1985 | Drexler . |
| 4,542,288 | 9/1985 | Drexler . |
| 4,544,835 | 10/1985 | Drexler . |
| 4,633,445 | 12/1986 | Sprague . |
| 4,636,893 | 1/1987 | McClure . |
| 4,637,679 | 1/1987 | Funato . |
| 4,656,346 | 4/1987 | Drexler . |
| 4,680,456 | 7/1987 | Drexler . |
| 4,734,794 | 3/1988 | Mehnert et al. . |
| 4,779,149 | 10/1988 | Watanabe . |
| 4,810,868 | 3/1989 | Drexler . |
| 4,851,929 | 7/1989 | Yang . |
| 4,885,458 | 12/1989 | Horiguchi et al. . |
| 5,033,040 | 7/1991 | Fujita .................................. 369/44.37 |
| 5,051,569 | 9/1991 | Tsuruoka et al. . |
| 5,056,080 | 10/1991 | Russell . |
| 5,097,351 | 3/1992 | Kramer . |
| 5,117,415 | 5/1992 | Ohta et al. . |
| 5,126,995 | 6/1992 | Nishizawa . |
| 5,130,521 | 7/1992 | Shino et al. . |
| 5,138,592 | 8/1992 | Fujita .............................. 369/44.37 X |
| 5,144,610 | 9/1992 | Horiguchi . |
| 5,144,616 | 9/1992 | Yasukawa et al. . |
| 5,166,836 | 11/1992 | Choi . |
| 5,179,463 | 1/1993 | Kramer . |
| 5,204,514 | 4/1993 | Horiguchi . |
| 5,210,635 | 5/1993 | Nagata et al. . |
| 5,210,730 | 5/1993 | Hayashi et al. . |

(List continued on next page.)

OTHER PUBLICATIONS

Lubell, P. (1995) "The Gathering Storm In High–Density Compact Disks," *IEEE Spectrum* 32–37.

Primary Examiner—Muhammad N. Edun
Attorney, Agent, or Firm—Oblon, Spivak, McClelland, Maier & Neustadt, P.C.

[57] ABSTRACT

A multi-byte, random access, mass storage/memory system is capable of storing multigigabytes of information and communicating that information over various standard output channels at high transfer rates. The system includes drive, software and media components configured to operate with no moving parts or substantially no moving parts. The system stores/retrieves data from a non-rotational media using an optical head that concurrently sweeps multiple parallel data tracks. The non-rotational media is a high density, rewritable/erasable structure capable of storing large amounts of digital information. The media has an open form factor based upon single cell zones which can accommodate various storage requirements. Also, the mass storage system has an internal bus structure that allows the system to act in isolation or multiple systems to act independently, but in concert for mass storage for one or more hosts.

37 Claims, 25 Drawing Sheets

U.S. PATENT DOCUMENTS

| | | |
|---|---|---|
| 5,217,820 | 6/1993 | Isshiki et al. . |
| 5,218,599 | 6/1993 | Tsuyoshi et al. . |
| 5,235,574 | 8/1993 | Aviles et al. ............... 369/44.32 X |
| 5,241,165 | 8/1993 | Drexler . |
| 5,253,245 | 10/1993 | Rabedeau ............... 369/44.21 X |
| 5,257,249 | 10/1993 | Rokutan . |
| 5,264,686 | 11/1993 | Kitahara . |
| 5,274,617 | 12/1993 | Terashima et al. . |
| 5,280,468 | 1/1994 | Nakajima et al. . |
| 5,285,328 | 2/1994 | Behr et al. . |
| 5,288,981 | 2/1994 | Davis . |
| 5,305,342 | 4/1994 | Ota . |
| 5,331,618 | 7/1994 | Nagai . |
| 5,361,238 | 11/1994 | Owechko . |
| 5,369,652 | 11/1994 | Bailey et al. . |
| 5,383,052 | 1/1995 | Okazaki et al. . |
| 5,408,373 | 4/1995 | Bajorek et al. . |
| 5,408,453 | 4/1995 | Holtslag et al. ............... 369/44.37 X |
| 5,414,551 | 5/1995 | Okazaki et al. . |
| 5,519,724 | 5/1996 | Tatah . |

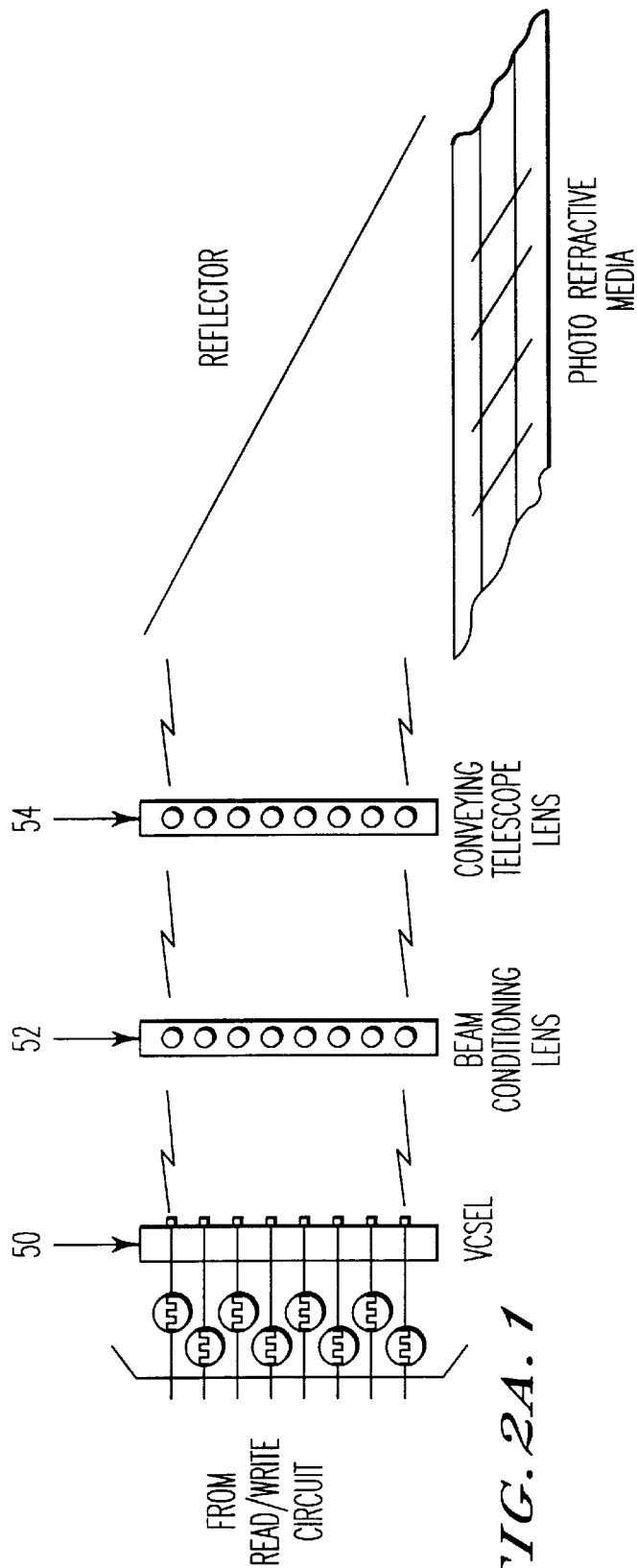
FIG.2A.1
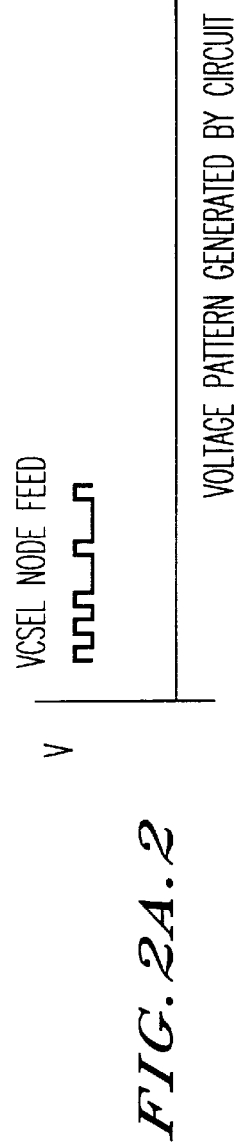
FIG.2A.2
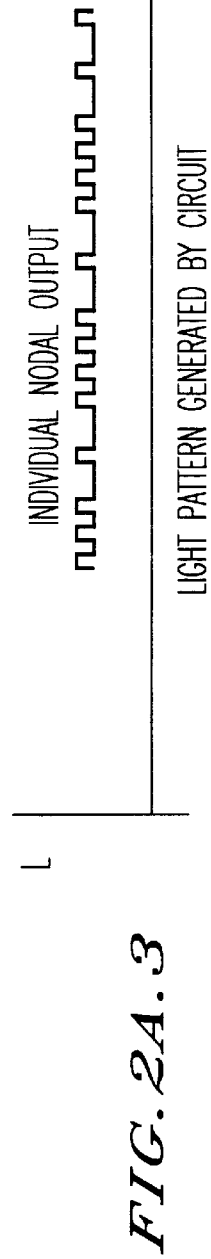
FIG.2A.3

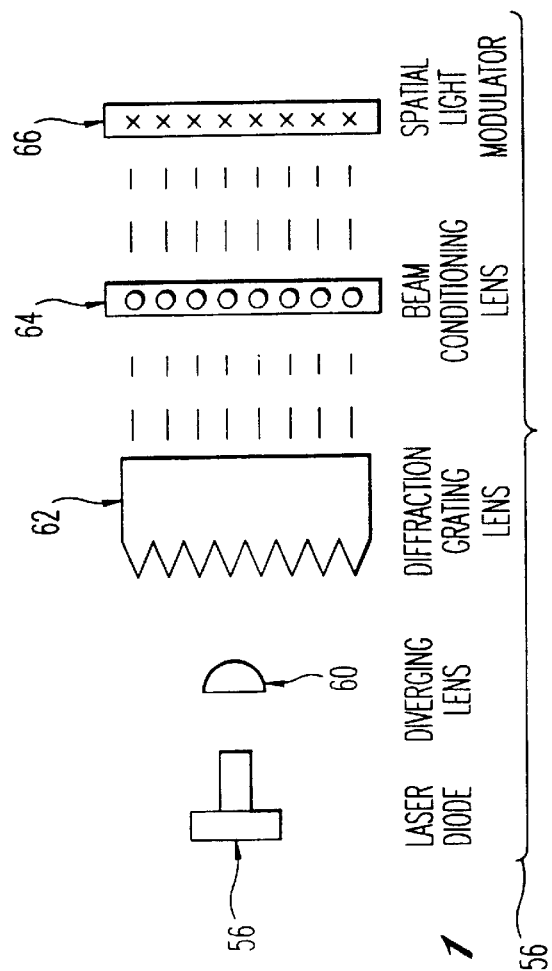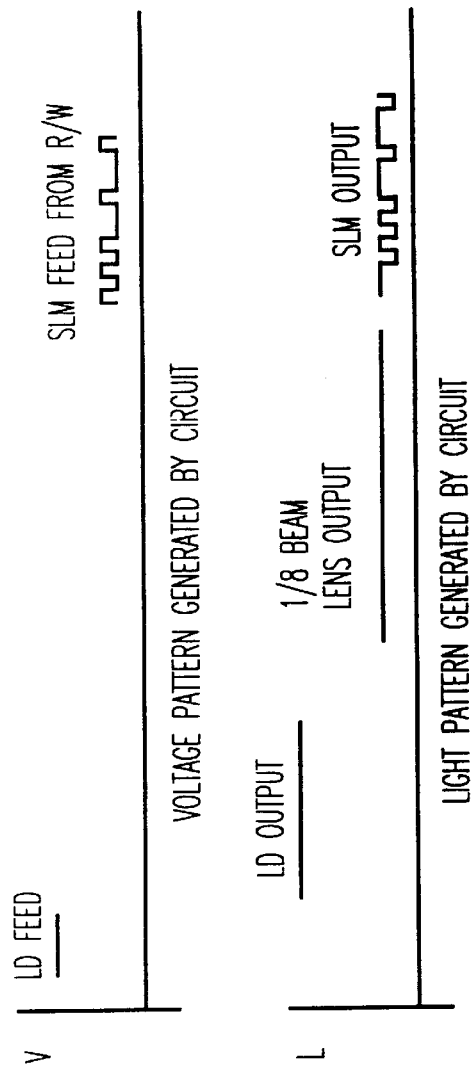
FIG.2B.1
FIG.2B.2
FIG.2B.3

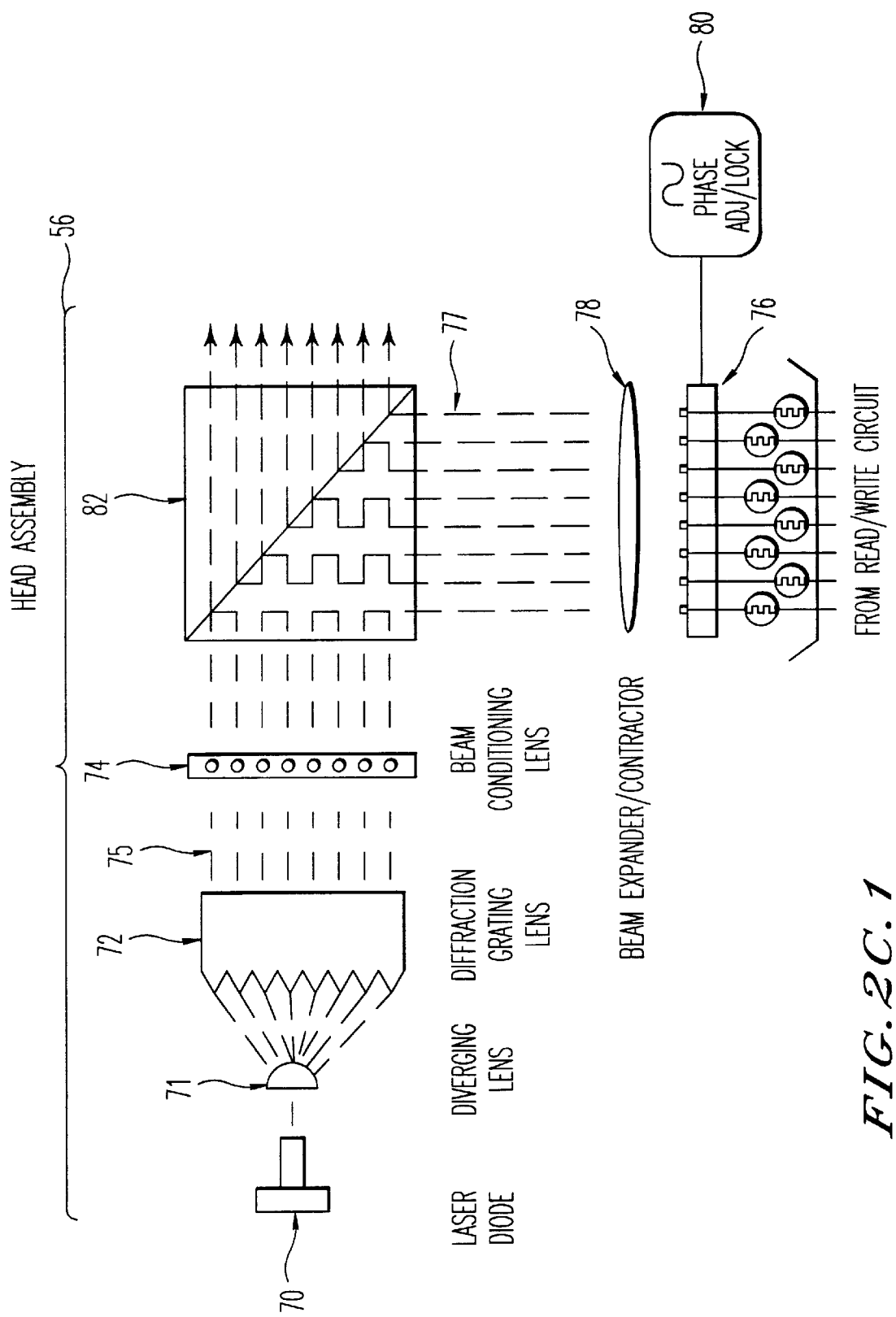
FIG. 2C.1

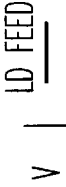
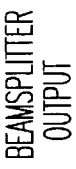
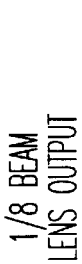
FIG. 2C.2 — Interference option–laser diode beams reduced by VCSEL R/W modulated beam pattern. (Out of phase adjustment)
FIG. 2C.3
FIG. 2C.4 — Superposition option–laser diode/VCSEL R/W modulated beam pattern. (In-phase adjustment)
FIG. 2C.5

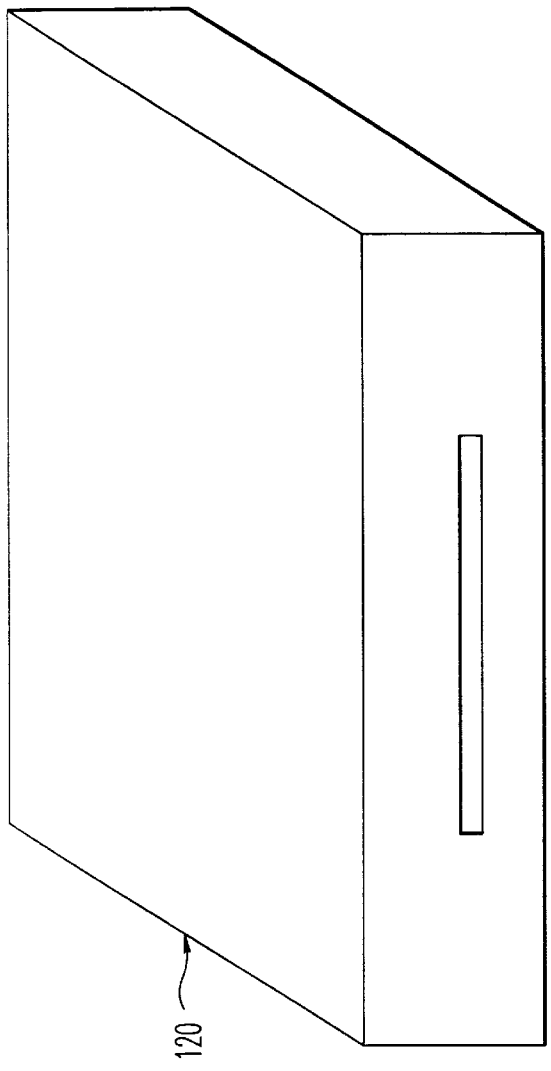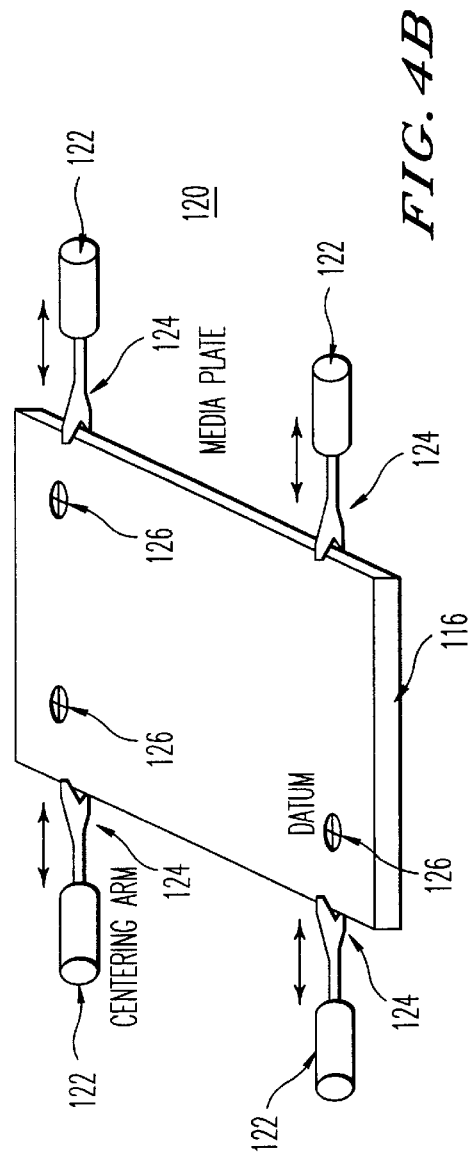

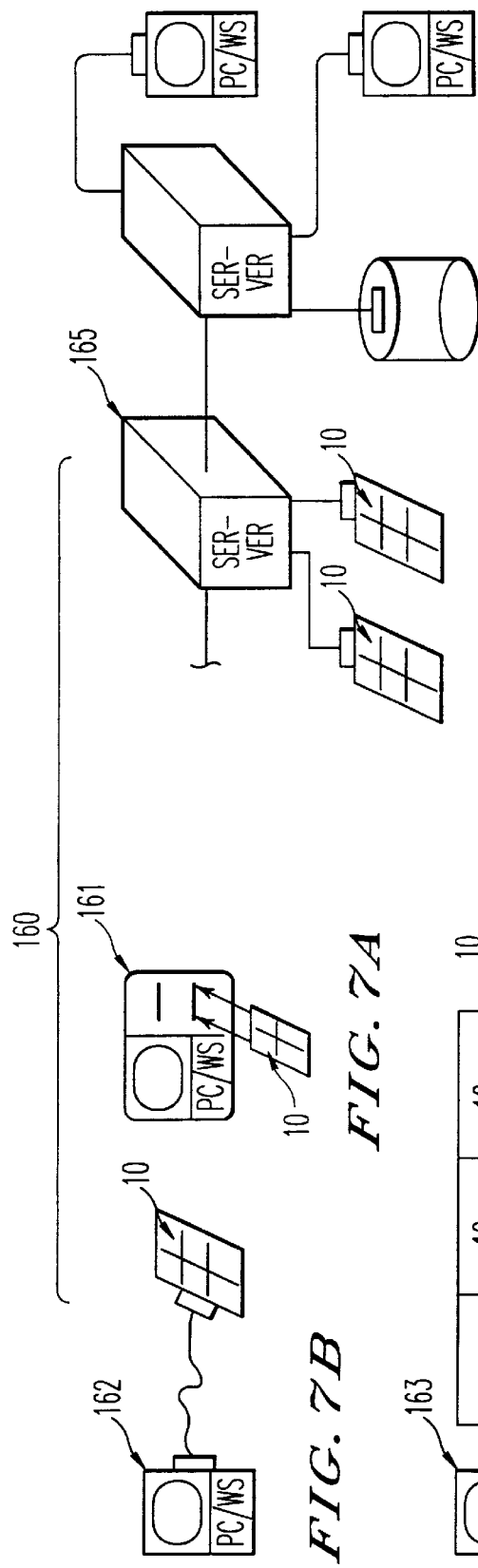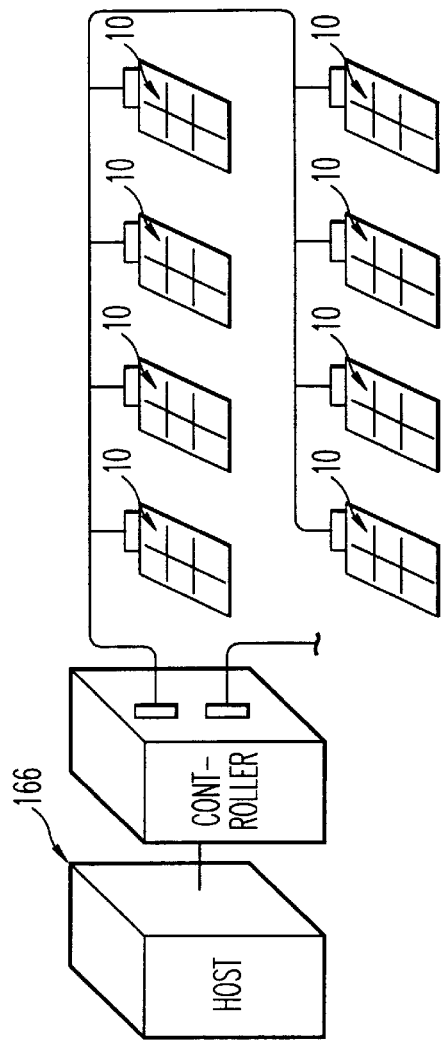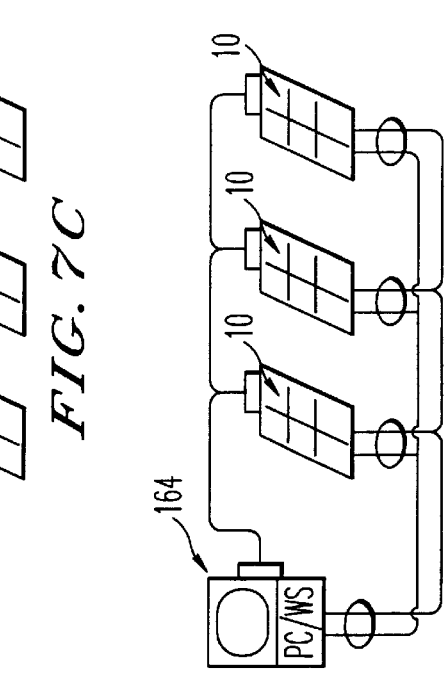

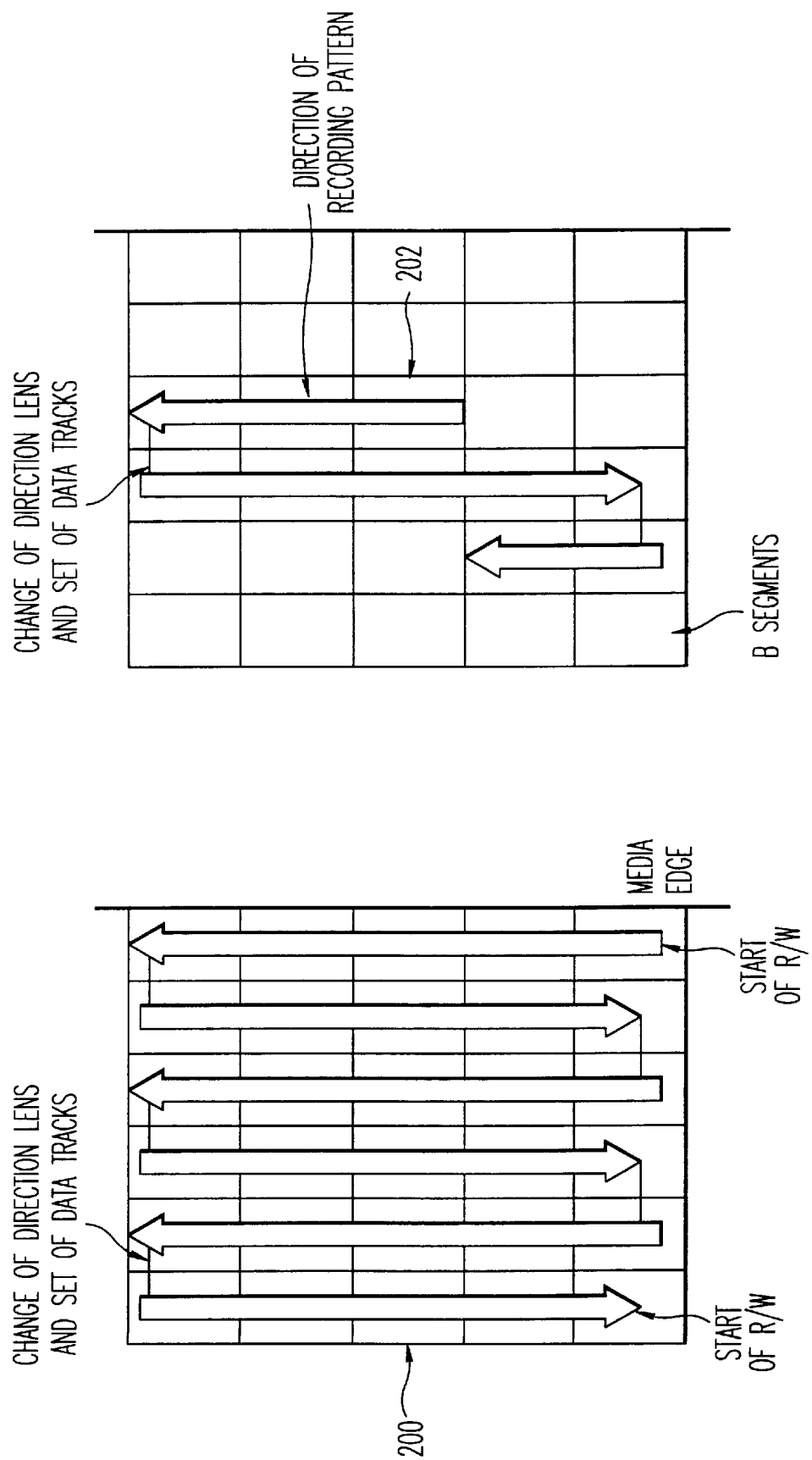

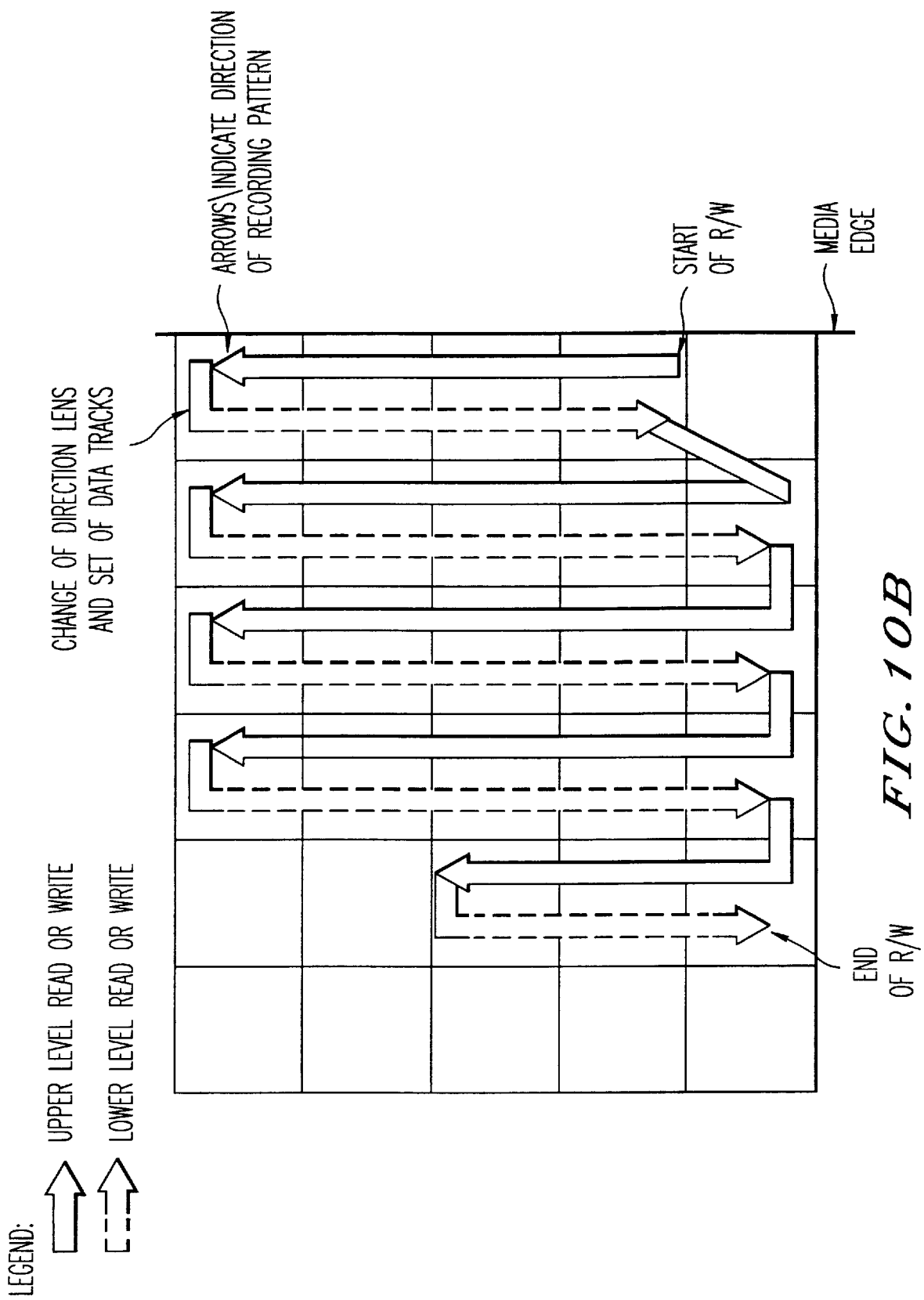

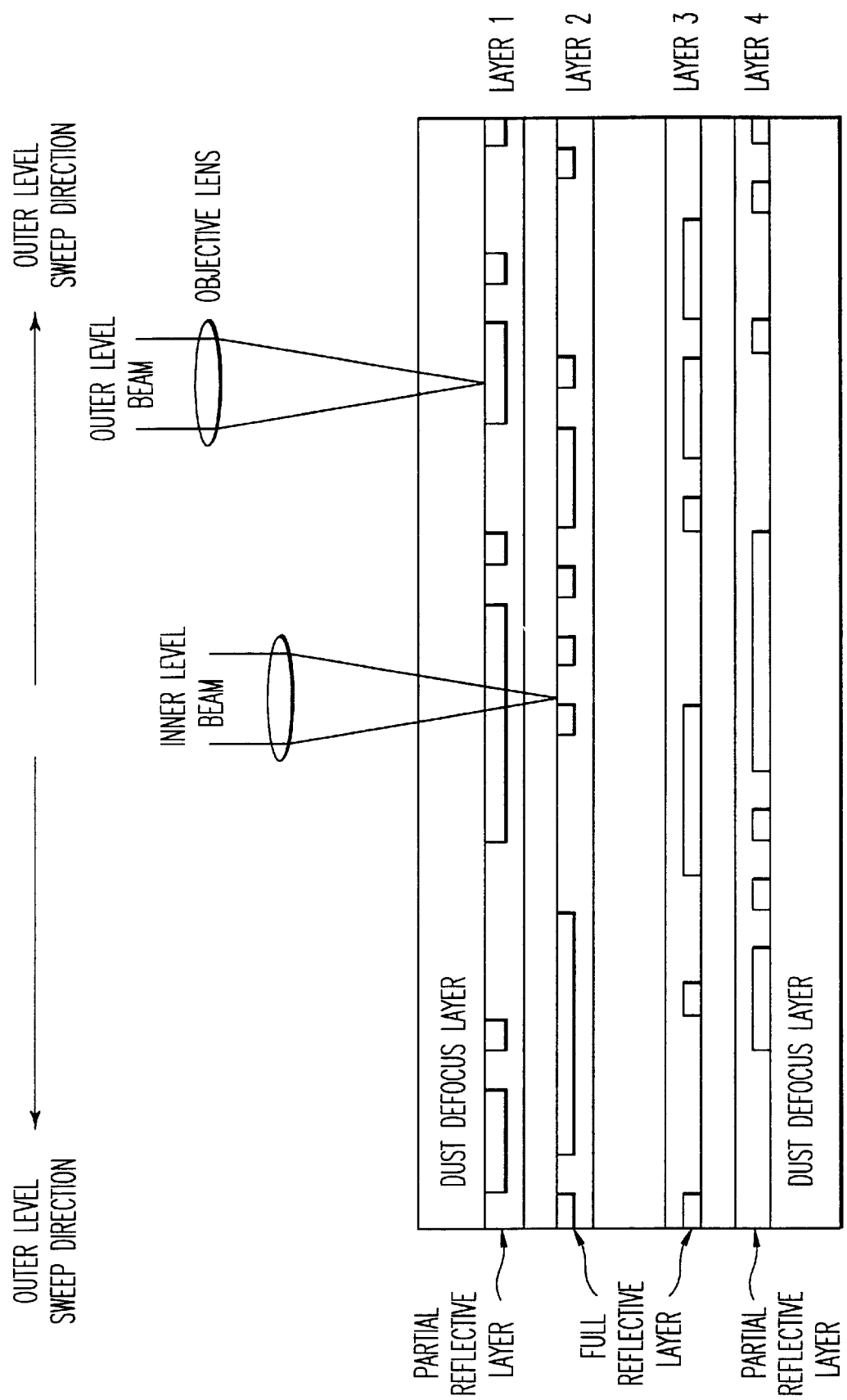

MULTIBYTE RANDOM ACCESS MASS STORAGE/MEMORY SYSTEM

FIELD OF THE INVENTION

The invention relates generally to the field of information storage systems and methods. In particular, the invention relates to an information storage system that combines random access memory and mass archival storage with minimal moving parts. More particularly, the invention relates to an information storage system for storing, retrieving and communicating multigigabytes of digital information at high transfer rates and in any of a multiplicity of formats.

BACKGROUND OF THE INVENTION

Over the past three decades, there have been major advances in the data processing industry that have revolutionized the manner in which information is gathered, stored, interpreted and processed. One advance has been the expansion of technological sophistication, as exemplified by the microprocessor chip. That is, data processing power which once required rooms full of equipment and kilowatts of electrical power to operate, can now be found in small silicon microprocessor chips. Another advance has been the cost of purchasing such data processing power. In particular, in the area of memory, where costs have dropped and capacities have increased, there has been an inevitable rush to fill newly available memory space with information. In this respect, the demand for more memory and storage space has always seemed to surpass the available supply of such space.

For users with exceptionally large data storage needs, individual mass storage devices such as magnetic tape and disk drives have not been able to satisfy the need for more storage space. Traditionally, the need for more storage space in such storage devices has been addressed by merely adding additional magnetic tape drives and/or disk drives to form multi-component storage systems. This has proven costly both in terms of expense and floor space.

Significant strides have been made in recent years toward increasing the data storage capacity of individual mass storage and random access memory devices. Despite these technical advances, all known mass storage devices are restricted by limitations imposed by mechanically rotated or translated media.

For example, a limitation on "storage density" is imposed by mechanical and physical tolerances in known storage devices. For rotating disk and linear velocity magnetic tape storage systems, the tolerances associated with individual mechanical/physical components involved in media movement accumulate to limit the density of individual data marks on the media. Tolerance accumulation amounts to an estimated density loss of twenty-five percent in data storage capacity for "fixed media" rotating disk storage systems. This percentage increases for rotating disk storage systems utilizing "removable media" due to the compounding effect of the tolerances associated with the various media that can be mounted in such systems.

Manufacturers have developed methods to compensate for tolerances associated with moving (i.e. rotating or translating) media. While compensation methods vary from manufacturer to manufacturer, such methods typically result in reducing the "density" of data storage on an individual media. Examples include larger marks or domain areas on the media, larger gaps between individual data marks on a track, greater track separation, additional inserted error correction bits, and insertion of high resolution materials into the media to highlight individual domains.

As a consequence of rotating disk or linear velocity tape movement, operational control systems for controlling such movements must be imbedded into the device. Examples of these control systems include managed read/write speeds, enhanced servo positioning systems, shock and vibration control systems, and enhanced error correction schemes. As these control systems operate in conjunction with the reading and writing of data, they adversely impact the speed of data storage and retrieval.

Another limitation arises as a consequence of the apparatus and techniques used to record data on and read data from the media. This limitation impacts the rate at which data is recorded or the rate at which it is retrieved.

Each individual mark on the media must be accurately stored and read to ascertain the information represented by the mark. Historically, a central goal in the mass storage industry has been to reliably and repetitively store and/or retrieve data one bit at a time using a single head assembly. Typically, the stored data is retrieved from the media and transferred serially from a mass storage device to a requesting device over a single data channel.

An improvement to the single head assembly, which results in a substantially increased the rate of data retrieval, is a rotating disk system utilizing multiple heads set in a vertical comb. The heads are inserted between multiple disks stacked concentrically on a common spindle for reading or writing a bit from each disk. Bits read concurrently are located at a common track and bit position for each disk in the stack. This multiple head assembly requires, and is limited by, close mechanical tolerances. The data bits read by each head are fed into a channel in a sequential manner, but the group of channels is synchronized for each bit read to create an eight bit (i.e. one byte) parallel channel. Each byte of data is eventually converted to a serial format for delivery to a CPU. The one bit per side output from a single fixed stack mounted in a drive is the nominal maximum achievable by a rotating drive machine.

In both single head/serial data transfer and ganged head/parallel data transfer storage devices, the data rate is controlled by two mechanical restraints. The first is the speed that the media is moved past the head(s), and the second constraint is the speed and accuracy that a mechanical arm can be positioned and maintained over the data tracks for read and write operations. Other head configurations that have been developed, such as multiple heads and helical scanning, have the same two limitations (i.e. rotational or linear speed of the media and mechanical positioning of the head(s)). The optical industry's current efforts to increase rotational speed by several times to improve data rates only serves to validate these constraints.

These limitations on the data rates of recovery/storage in known storage devices have lead developers to time buffer the interface between the storage device and CPU with one or more solid state memory (RAM) devices. This buffering scheme is commonly referred to as a "cache memory" system. The RAM devices are usually as fast as the CPU. Although the RAMs normally do not parallel the size of a storage device, they are sufficiently large to accommodate the largest drive file and are capable of distributing data at a rate proportional to the highest rate transmitted/received by the CPU or the storage device.

Cache memory systems are necessary, but expensive, hardware especially in light of their increasing size within a computer system. RAM memory devices are on the order of two magnitudes more expensive than equivalent mechanical storage alternatives. Also cache memory systems require a uniquely independent hardware, architectural, and software structure compared to mechanical storage. This adds to the cost of a cache memory system in a mass storage system implementation.

The industry developed "Extended Memory System" is an attempt to reduce the cost of cache memory systems. Extended memory software systems expand the capability of RAM by utilizing preassigned fixed hard disk memory as RAM whenever the solid state RAM capability has been exceeded. This technique, however, is a software translation rather than a true physical integration of the memory devices. Recovery or storage of data within an extended memory space is accomplished at essentially the same rate as that of normal archival storage due to the use of serial buses and the mechanical restraints previously noted.

As the demand for larger storage devices, larger file structures, and faster retrieval/storage intervals increases, demands on caching are expected to increase. In parallel with these volume increases, larger and faster file transfers between archival storage and RAM will be required. Unless these two independent structures are integrated, the delays arising from transferring data between them are expected to increase.

In view of the foregoing, it is apparent that a new type of data storage system is needed. It is therefore a principle object of the present invention to provide a mass storage/memory system that features enhanced digital storage capacities, accelerated data rates, an integrated RAM and archival memory system, open format ports, and a multiplicity of internal read/write channels.

SUMMARY OF THE INVENTION

The present invention features a multi-byte, random access, mass storage/memory system capable of storing multi-gigabytes of information. The system can retrieve, store and/or communicate information in the sending party's format over standard output channels and at high transfer rates of at least 30 MB/s in either a compressed or uncompressed mode. The invention includes drive, device, software and media components configured to operate with no moving media and substantially no moving parts. In other words, the functional platform is stationary and the component elements are substantially solid state.

The system stores/retrieves data from a geometric-shaped non-moving stationary media using (one or more) optical heads that concurrently and/or independently sweep multiple parallel data tracks. The velocity and radial position of the sweep angle of the optical heads is controlled by analog signals fed into a solid state drive mechanism which can be a "magnetic" or "piezoelectric" driver. The sweep rate of the optical head is minimally equivalent to the linear velocity of a track on a rotating disk system. The sweep of each head covers at least eight data tracks. For example, in a standard storage request action, four read/write heads act concurrently on a thirty-two bit wide data track. The data recovery rate would be at least thirty-two times faster than a single head rotating disk system and at least four times faster than a stacked rotating disk system.

More specifically, the invention features a mass storage system comprising a media housing, an optical head assembly, a lens/detection assembly and a solid state pivot mechanism. The optical head assembly includes first and second laser light sources for generating read and write beams. Alternatively, a laser diode assembly can be used, wherein each diode is modulated with its respective track data and then subsequently amplified.

The head assembly also includes a lens assembly including a beam splitter/combiner and a diffraction grating lens. The splitter/combiner combines the read and write beams. The grating lens splits each of the read and write beams into a plurality of parallel read and write beams. Further, a beam expander assembly collimates and extends the focal point of these parallel beams. A optical switch assembly can be optically coupled to the beam expander assembly to modulate the individual write beams with the data to be written for each data track. Alternatively, the modulation of the plurality of beams can be accomplished by the imposition (interference addition) of premodulated light beams on the individual beams exiting the grating lens.

The lens/detection assembly is optically coupled to the head assembly. In one embodiment, a positionable directing lens optically couples the lens/detection assembly to the head assembly. The lens/detection assembly includes an angled beam splitter for directing the parallel read and write beams to the media for simultaneously reading multiple tracks of data therefrom or thereto. The lens/detection assembly also includes diverging lens for directing a plurality of reflected beams from the media to a photodetector.

A solid state pivotal mechanism controls the relative movement of the optical head assembly and the directing lens. The solid state pivotal mechanism may comprise at least one of a piezoelectric element or a magnetic element. In one embodiment, the lens/detection assembly is stationary. The solid state pivotal mechanism moves the optical head assembly along a first axis, to sweep the parallel data tracks, while the directing lens positions the parallel read and write beams onto the proper set of data tracks.

In another embodiment, the solid state pivotal mechanism moves the optical head assembly along a first axis, and the lens/detection assembly along a second axis orthogonal to the first axis. Once again, the directing lens positions the parallel read and write beams onto the proper set of data tracks. In yet another embodiment, the solid state pivotal mechanism is configured in a planar, two axis arrangement. That is, the optical head assembly moves along a first axis or sweep and is positioned along a second axis, orthogonal to the first axis, thereby eliminating the need for the directing lens.

During a read cycle, the optical head directs the multiple parallel beams to the lens/detection assembly, which in turn directs the beams to the media surface. The reflected beams are directed to a partitioned detector which outputs an electrical signal in response to the presence or absence of a data mark on the media. During a write cycle, each of the multiple parallel beams emitted by the optical head, is modulated in accordance with the data to be written. A byte of serial data from a central processor is converted and written as a parallel byte across the tracks by the head, while a parallel byte of data is directly written.

The non-rotational (i.e., non-moving or stationary) media referred to herein is a high density, rewritable/erasable structure capable of storing large amounts of digital information. The media has an open form factor based upon single cell zones which can be grown to accommodate various storage requirements. The media can be either fixed or removable. Once within the system, the media is securely constrained in a stationary position. Because the media is non-rotational and the heads are positionable by way of a solid state mechanism, the storage density limitations of known storage systems do not apply to this invention. As such, the media can be marked with a denser pattern to provide even greater overall data storage capacity.

More specifically, the invention features a non-rotational media for a mass storage system. The media includes a substrate having first and second surfaces, and a radiation sensitive layer covering the first surface. The radiation sensitive layer reflects one or more incident beams of laser light from the surfaces. The layers are partitioned to include a plurality of zones on the radiation sensitive layers. Each zone has (i) a plurality of parallel, uniformly spaced, data tracks which are markable when exposed to a beam of laser light, (ii) one or more servo tracks having a predetermined reflective pattern for distinguishing servo tracks from data tracks, and (iii) a plurality of sector marks within each data track for providing an indication of a boundary between adjacent groups of data tracks as well as a synchronizing point for the device circuit.

The media may also comprise a second radiation sensitive layer covering the second surface of the substrate, and third and fourth radiation sensitive layers covering the first and second radiation sensitive layers respectively. These radiation sensitive layers are partitioned to include a plurality of zones, as described above.

In one embodiment, the data tracks of a multi-layered media are offset from the inner and outer layers. In another embodiment, the data tracks are vertically disposed immediately below the tracks on the layer above them. This requires that the objective lens be brought into a critical focus position for each specific layer.

Each zone on the media is capable of storing at least one-half (0.5) gigabyte of data. Each data track on the media has a width of about 0.5 microns, and the data tracks have a pitch of about 1.0 microns. Servo tracks have a width of approximately 1.0 micron.

The mass storage system of the invention has intelligent software and hardware that allows the system to act in isolation or multiple systems to act independently, but in concert for memory storage with one or more central processors. More specifically, mass storage system of the invention includes a microprocessor for controlling internal input/output operations between RAM memory, archival storage and external input/output operations. The system includes a parallel data bus structure coupling RAM memory to the external central processor to provide a direct data path for external input/output operations. The system also includes a serial bus coupling archival memory to the external central processor to provide a direct data path for external input/output operations. Multiple serial input/output access ports switchably link to internal data buses. The repetitive access ports and multiple bussing structure allows simultaneous storage and/or retrieval operations and full device memory migration.

Because the mass storage system is controlled by an internal microprocessor, the system is responsive to external requests for data storage/retrieval and functions as a free-standing system that independently routes, stores, encodes, manipulates and verifies data. Because of this versatility, the system may be configured to operate in a variety of memory storage environments including computer systems ranging from PCs to mainframes, networks, and other controller driven devices.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

FIGS. 2A–2C are illustrations of various optical head assemblies useable in the mass storage system.

FIG. 4 is an illustration of certain internal components of the media housing.

FIGS. 7A–7F is a series of illustrations showing the various configurations in which the mass storage system can be utilized.

FIG. 10A–10D are illustrations showing read/write patterns for the mass storage system.

DETAILED DESCRIPTION

Figure 1A:
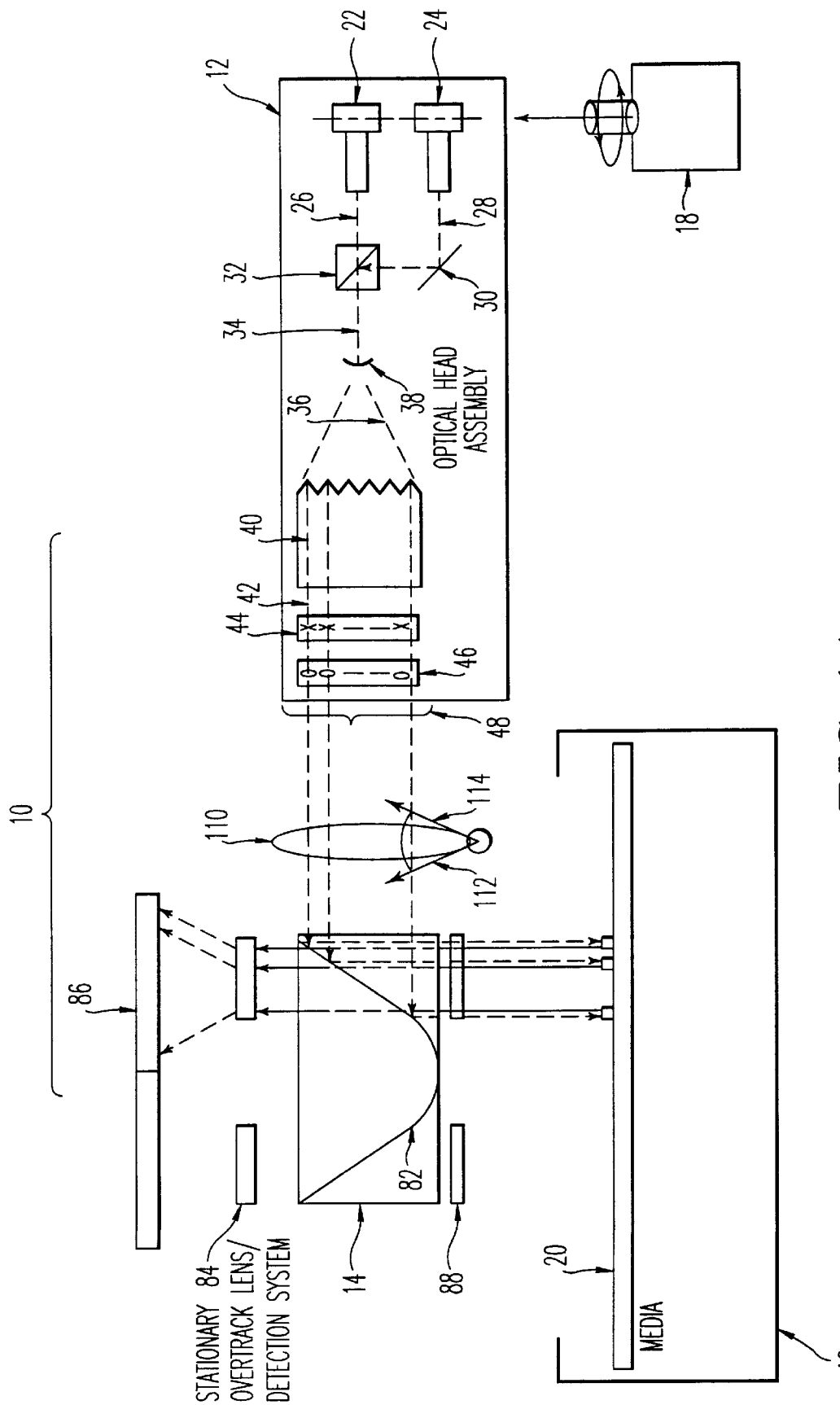
FIG. 1A–1C are illustrations of three embodiments of a mass storage system incorporating the principles of the invention.
Figure 1B:
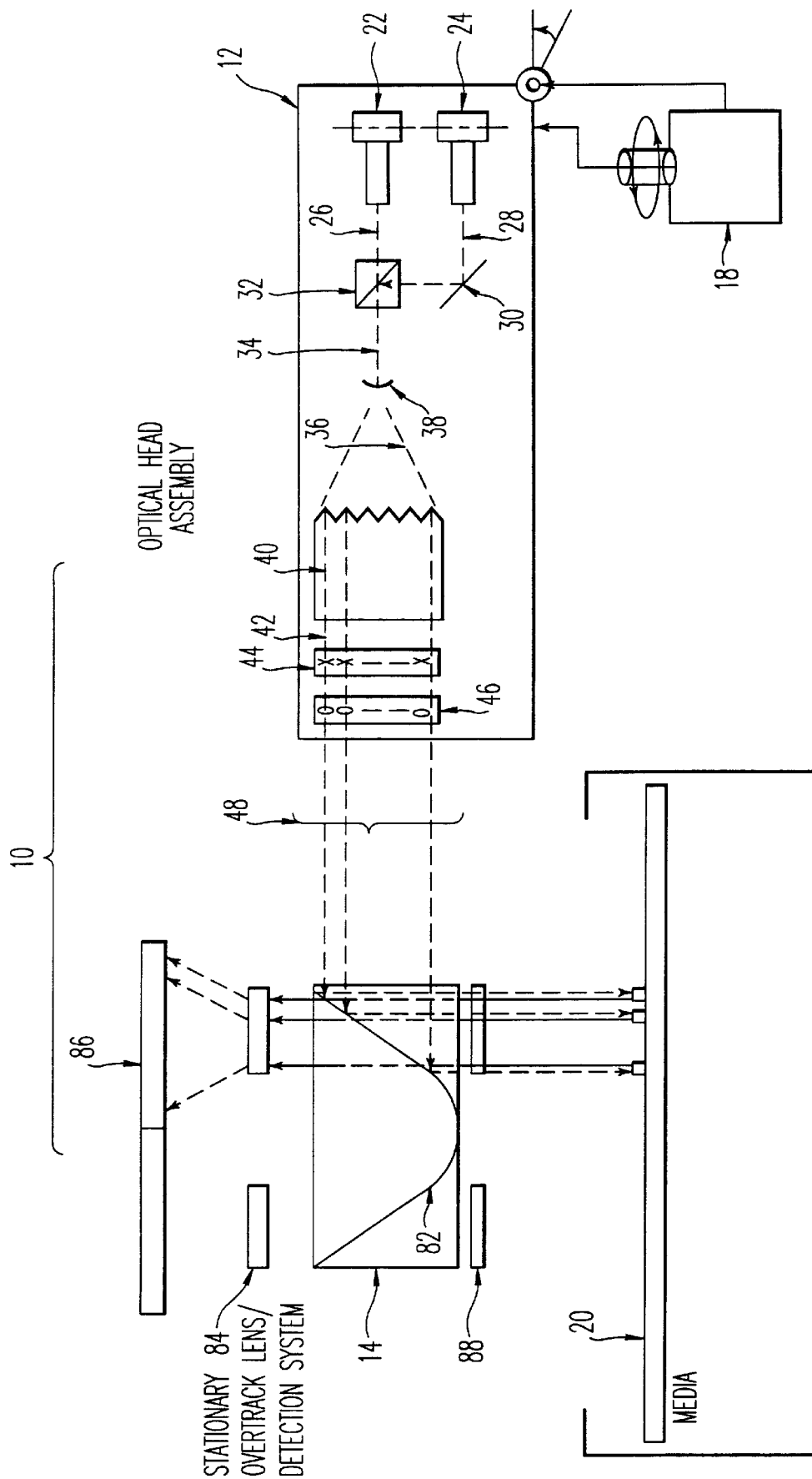
Figure 1C:
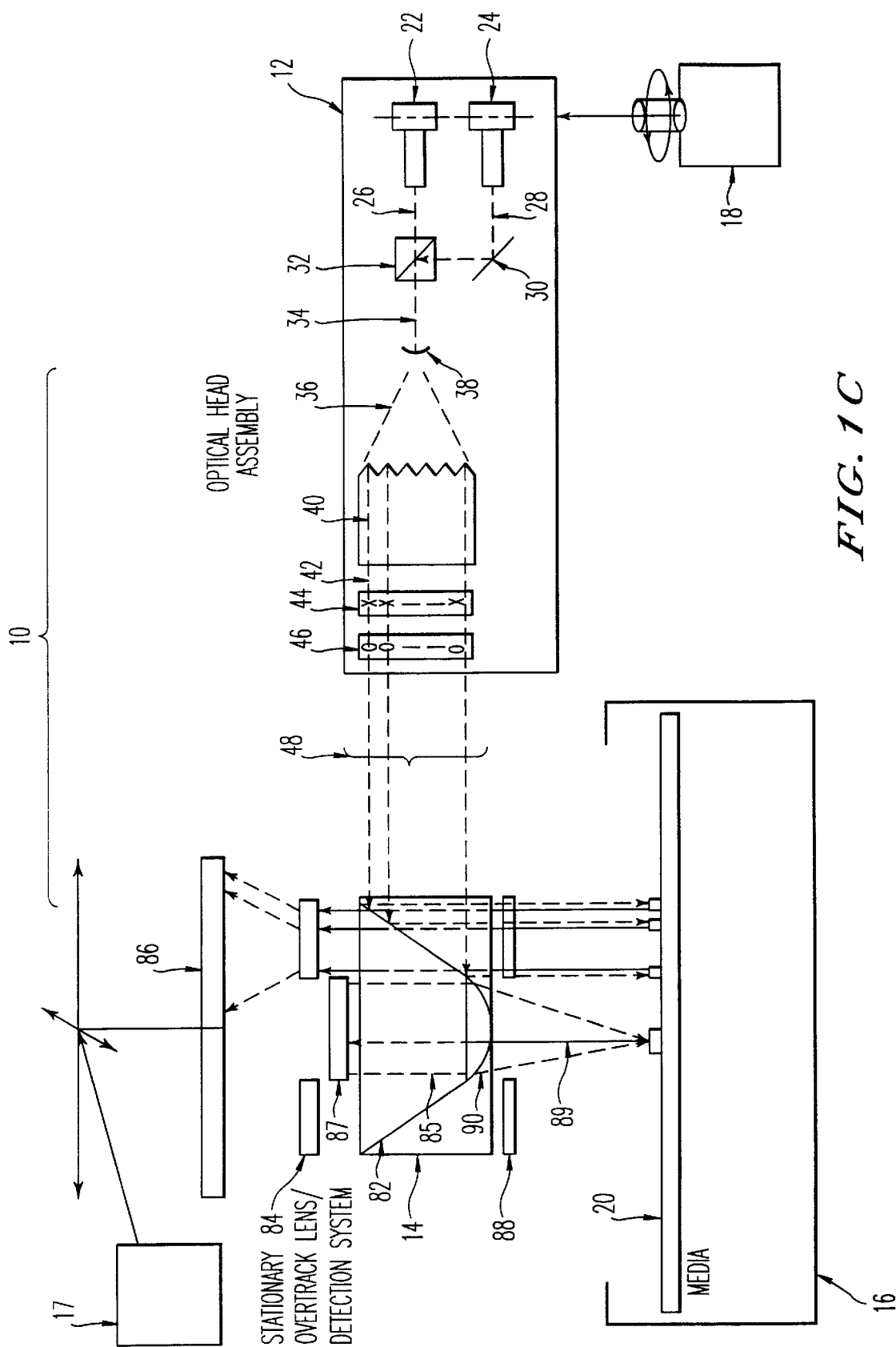

1. System Hardware—The present invention features a mass storage/memory system capable of storing multigigabytes of information and communicating that information over various standard output channels at high transfer rates. Referring to FIGS. 1A–1C, the main components of the system 10 include an optical head assembly 12, a lens/detection assembly 14, a media housing 16 and a solid state pivot mechanism 18. The components are configured to operate with no moving parts or substantially no moving parts, such that the system 10 is "solid state" or "substantially solid state." The system 10 stores/retrieves data from a non-rotational media 20 securely disposed in the media housing 16. The non-rotational media 20 is a high density, rewritable/erasable structure capable of storing large amounts of digital information. While the optical head assembly 12 and the lens/detection assembly 14 are depicted with discrete components, it is noted that these assemblies can be packaged as singular integrated silicon devices. Also, while the media 16 shown in FIGS. 1A–1C exhibits tracks which are raised above the surface, the media is not grooved. The raised tracks are for illustration purposes only, to visually separate the individual data tracks.

1.1. Optical Head Assembly—In one embodiment, the optical head assembly 12 includes first and second laser diode assemblies (22, 24) for generating read and write beams. Each assembly outputs a collimated beam of light (26, 28). The read assembly 22 continuously emits the beam 26 during a read or a write cycle. The write assembly 24 emits the beam 28 during a write cycle, which is combined with the read beam 26 by a mirror 30 and a beam splitter 32.

A portion of the combined beam 34 is diverted to a diagnostic circuit (not shown) for power measurement and calibration.

A beam splitter assembly is optically coupled to the combiner/splitter 32. The splitter assembly includes a diverging lens 38 for spreading the beam 34 into a wider beam 36. A diffraction grating lens 40 splits the wider beam 36 into a plurality of parallel and precisely spaced (read or read/write) beams 42. In one embodiment, the beam splitter assembly provides an eight beam (i.e., a one byte) output.

The parallel beams 42 are modulated by a blanking circuit 44. The circuit 44 is disabled during a read cycle and enabled during a write cycle. As such, the write beams are the only beams attenuated by the circuit 44. The attenuation (or blanking) of the beams passing each lens is controlled by the Read/Write circuit. Each write beam is attenuated in synchronization to the data to be written on the media. The plurality of beams pass into an anamorphic beam expander/contractor lens 46 which adjusts the beams 48 to an extended focal point located at the objective lens assembly 88. The extended focal point allows the limited movement of the objective lens, onto which the beams 48 impinge, without substantially changing the diameter of the beams. Lens 46 also redimensions the parallel separation distance between the plurality of beams at 42 to the data track separation required by the media and influenced by the reflector 82.

Figures 1, 2, 5A:
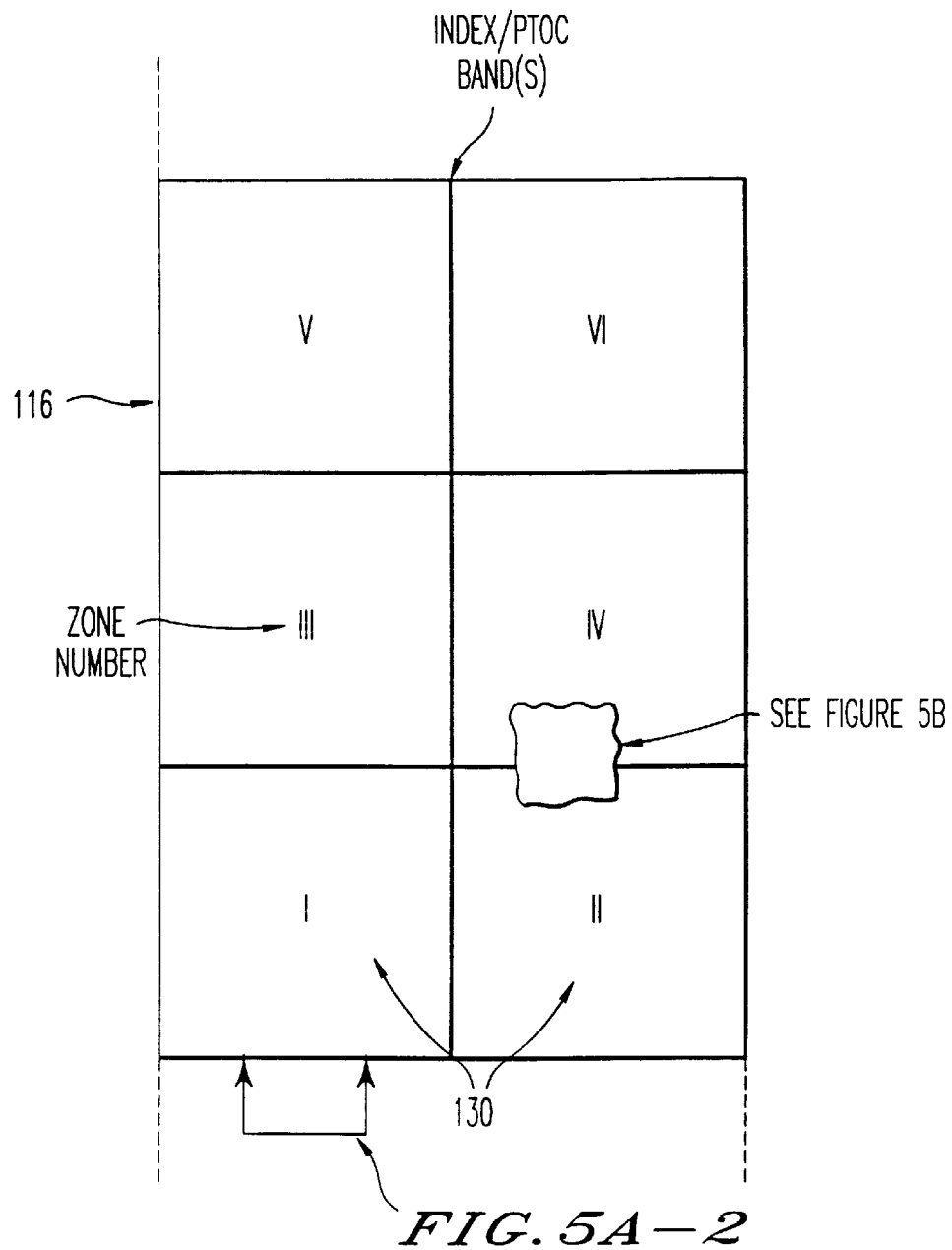
FIGS. 5A–5B are illustrations of the zones, data tracks, servo tracks and sector crossings disposed on a non-rotational media.
Figures 2, 5A:
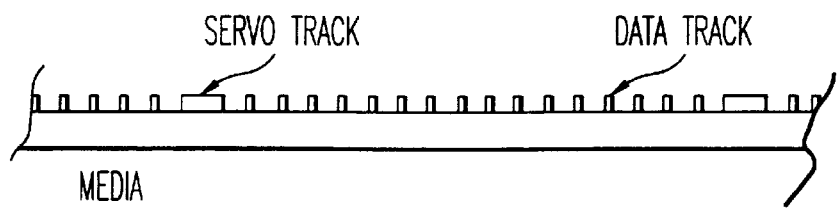

The optical head assembly is moved by a pivotal mechanism 18 such that the beams 48 can be swept through a precise lateral arc at a prescribed velocity. The pivotal mechanism, including means and techniques for accomplishing a controlled sweep utilizing piezoelectric devices or magnet devices, is described in detail below In another embodiment, shown in FIG. 2A, the optical head assembly utilizes a VCSEL diode array 50 arranged in a prescribed pattern (e.g., a one by eight configuration) for at least the read assembly. A beam conditioning lens 52 optically coupled to the VCSEL 50 corrects the cross-section, deastigmatizes, and collimates a plurality of parallel and precisely spaced beams. The conditioned beams pass into an anamorphic beam expander/contractor lens 54 which adjusts the beams to an extended focal point and modifies the beam's parallel separation, as explained previously. Because VCSELs can be configured in a variety of geometric patterns, a rectangular beam pattern may be employed and selected output beams diverted to their specific sweep locale using lensing systems. Also, using a VCSEL for the read assembly advantageously increases the read speed of the system.

Referring to FIG. 2B, the write assembly may utilize a SLM (Spatial Light Modulator) for the blanking lens. As shown, the optical head assembly 56 includes laser diode assembly 58 and a diverging lens 60 for spreading the beam into a wider beam. A diffraction grating lens 62 splits the wider beam into a plurality of parallel and precisely spaced beams. A beam conditioning lens 64 optically adjusts the beams, as explained previously.

In another embodiment, an optical head assembly utilizes beam modulation techniques based on the theory of interference. This theory teaches that when two wave fronts of identical frequency collide, they cancel each other if they are exactly 180° out of phase. Alternatively, the waves add together if they are in-phase. FIG. 2C shows a head assembly capable of generating cancellation and addition waveforms. As shown, the head assembly 56 includes laser diode assembly 70 for generating an interference beam. A diverging lens 71 spreads the beam and a diffraction grating lens 72 splits the beam into a plurality of parallel beams. A beam conditioning lens 74 optically adjusts the beams 75. A VCSEL diode array 76 generates a plurality of read or write beams. A phase locked loop adjusts the phase of the beams 77 to be the same phase (or 180° out phase) as that of the beams 75. A beam expander/contractor lens redimensions the separation distance of the plurality of parallel and precisely spaced beams 77 to that of the head assembly beam separation. The two sets of beams pass into a beam combiner 82. The output is either the cancellation or combination of the two sets of beams.

1.2. Lens/Detection Assembly—Referring back to FIGS. 1A–1C, the lens/detection assembly 14 is optically coupled to the optical head assembly 12 and includes components for directing the plurality of parallel beams 48 to the media for simultaneous reading of multiple tracks data therefrom or simultaneous writing of multiple tracks of data thereto. The parallel beams 48 emitted from the head assembly 12 are directed into the angled beam splitter 82. Various angles for the beam splitter are possible. A forty-five degree angle translates into a one-for-one separation of the beams at the media 20 with respect to the beam separation at the head assembly 12. An angle of less than forty-five degrees proportionally increases the separation of the beams at the media 20.

The beams reflect off the splitter 82 and pass through an objective lens 88 to the media 20. The objective lens 88 optimizes the focus of each of the parallel beams on the media 20. As explained previously, the focal point of the parallel beams is adjusted by the anamorphic lens 46 for an extended distance. The diameter of each beam is focused into the pupil of the objective lens 88, which is capable of vertical adjustment by a servo system to focus each beam onto its respective data track. Only a small amount of movement of the objective lens 88 is required to bring the beams into focus on the media because (i) the media is fixedly orthogonal to the reflected beam, (ii) the reflection angle very low, and (iii) the media stationary. In addition, each lens in the anamorphic lens assembly 46 focuses it respective beam to a common target point to compensate the variation introduced by the reflection pattern of 82. By setting the focus of the objective lens 88 to capture the center nominal of the eight beam spread, the beams may be focused in bulk rather than individually. As such, only a single wide angle objective lens 82 is required.

If the media 20 is a multilayer structure, the focus of the objective lens is adjusted to optically access the individual deeper layers in the media. The data tracks on the deeper layers may be offset from the surface layer, i.e., physically located within the space between tracks on the upper layer. In this offset variation, the lens track pitch from the servo track to the first data track is also adjusted when reading/writing to the deeper layers. Pitch adjustment is handled by system software.

The beams strike the mirrored surface of the media 20 and reflect therefrom. The reflected beams image the presence of a mark (anomaly) or the absence of a mark on the media 20 and reflect the detected information through the beam splitter 82 into a diverging lens 84. The diverging lens 84 directs each of the reflected beams to a partition in a photodetector 86, which outputs an analogue electrical signal proportional to the reflection.

The reflective surface of the beam splitter 82 may be significantly longer than the spread of the parallel beams 48 emitted from the optical head assembly 12. The longer length allows the beams to be repositioned (up or down) on the reflective surface, and thus to different tracks on the media, by a pivotal mechanism (see FIG. 3C), which is explained in detail below. The slope of the reflective surface may be less than forty-five degrees to allow the surface to extend above the media over multiple sets of tracks without significantly affecting the diameter of each beam. Alternatively, the reflective surface of the beam splitter may have an elliptical/spherical/parabolic shape that reflects the beams 48 without distortion as the optical head sweeps through its arc and simultaneously allows the beams reflected from the media to pass through its surface to the detector 86.

In one embodiment, shown in FIG. 1A, the lens/detection assembly 14 is fixed in a stationary position above the media so that each of its reflectors 82 optically bridge an entire media zone. The plurality of beams are redirected to a different set of tracks via pivotal mechanisms shown in FIGS. 3B and 3C to be described later.

In an another embodiment, the lens/detection assembly 14 is positioned in a plane above the media 20 and held precisely parallel to the media. The position of the assembly 14 relative to the data tracks on the media is held by a tracking system which locks onto a servo track located on the media. Servo tracks are factory written onto the media and precisely positioned by use of a servo-writing device.

The tracking system includes a Laser/Photodetector assembly 87 that emits a beam of light through the lens 82. This beam is focused onto a servo track by an objective lens 90 formed at the apex of the reflective surfaces of the beam splitter 82. The focused beam strikes the servo track and reflects back through the objective lens 90 to the laser/photodetector assembly 87. More specifically, the reflected beam irradiates segments of the photodetector 87 in relative proportion to the offset (or centering) of the emitted beam on the servo track.

An alternative technique involves a direct (i.e. orthogonal) scan of the media 20 instead of a reflective (i.e. side) scan. This technique interchanges the position of the optical head assembly 12 with the directing lens 84 and laser/photodetector assembly 86. The beams 48 emitted from the optical head assembly 12 pass directly downward through the beam splitter 82 and reflect off of the media. These media reflected beams would in turn reflect off of the lens/detection assembly to the side and into the laser/photodetector assembly 86 due to a phase shift. This configuration would produce a physically taller rather than wider storage system.

Figure 3A:
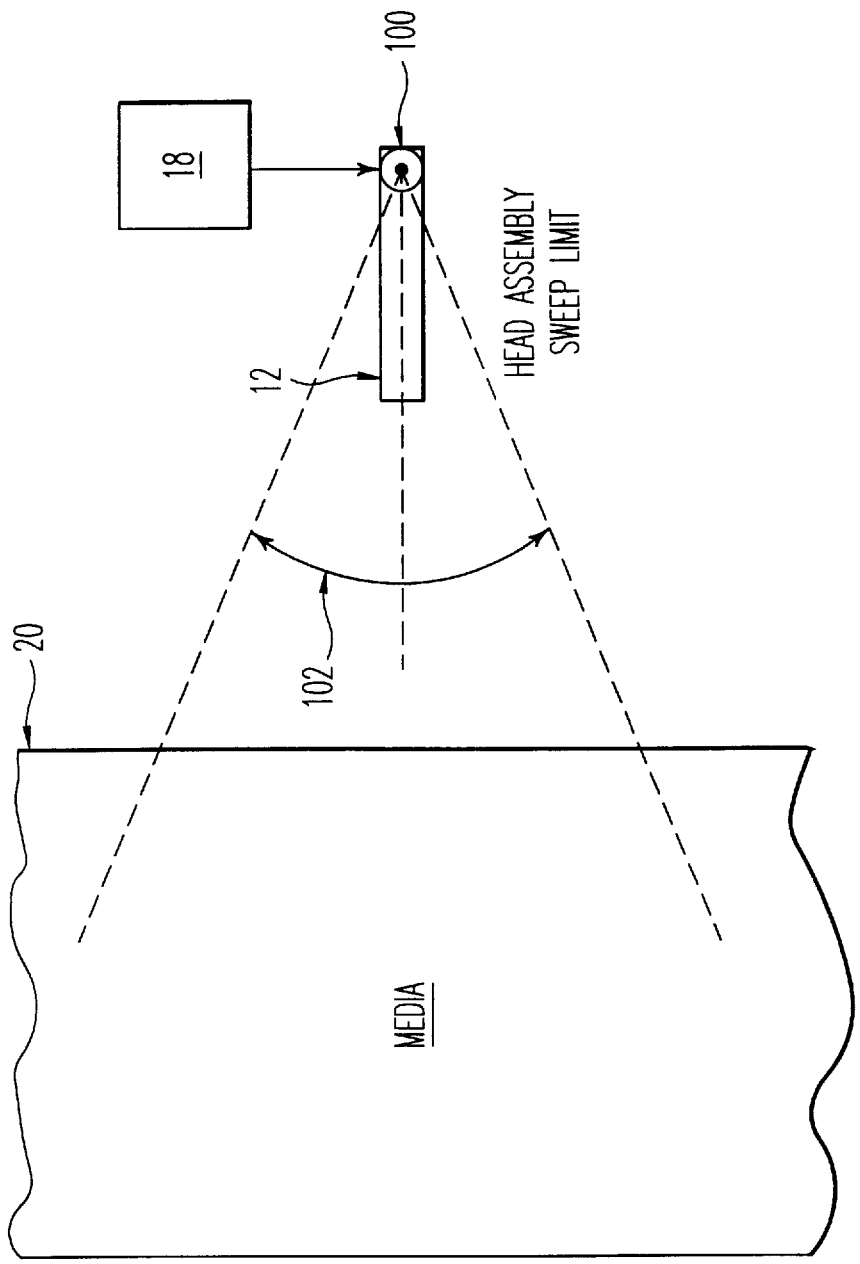
FIGS. 3A–3C are illustrations of the movement of the optical head assembly, the lens/detection assembly and the directing lens via the pivotal mechanism.
Figure 3B:
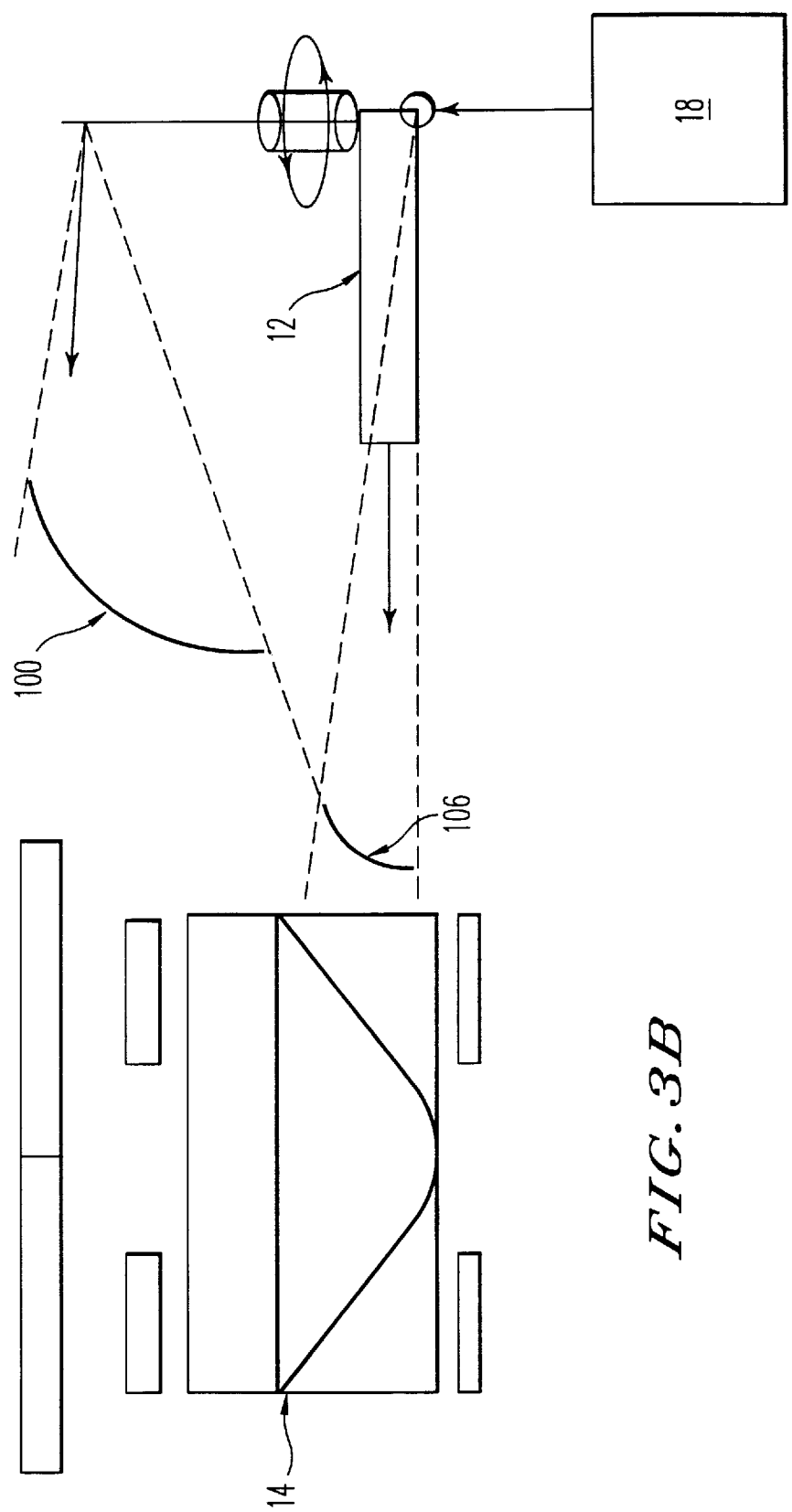
Figure 3C:
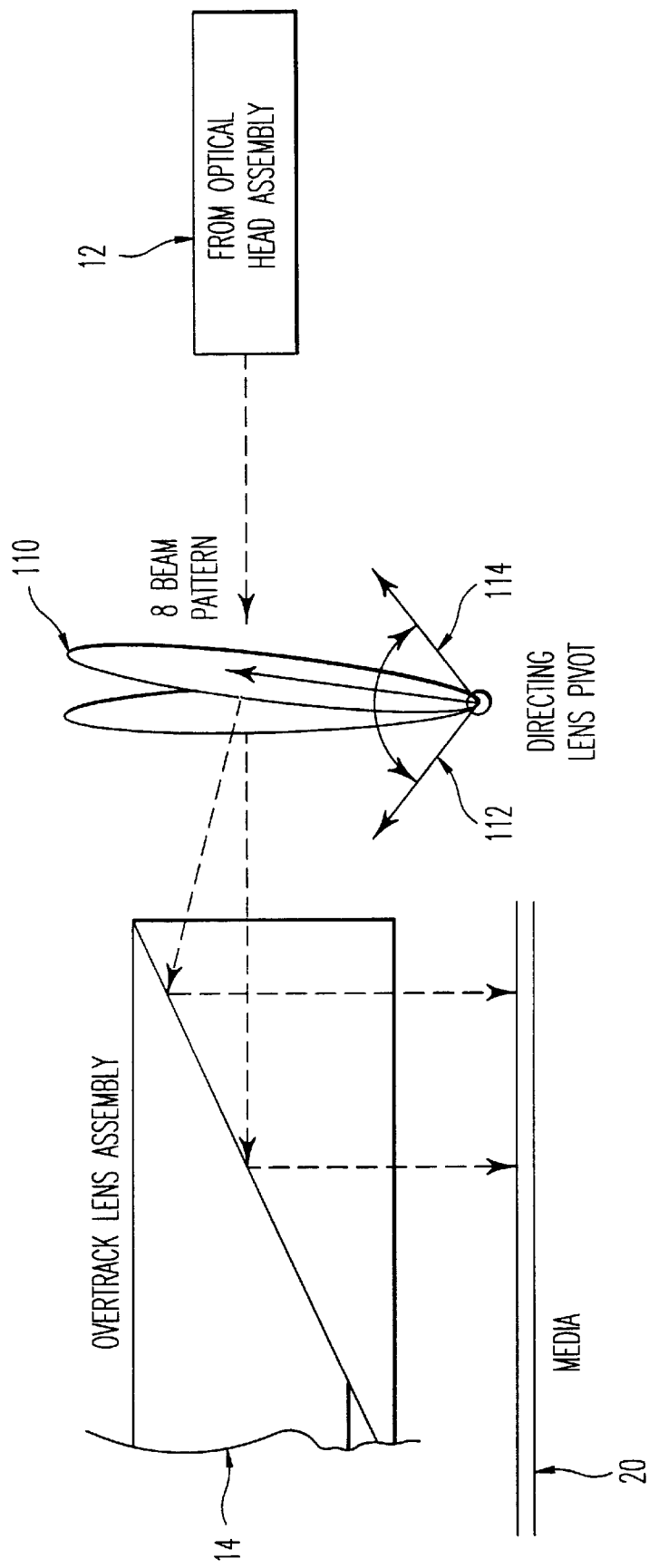

1.3. Pivotal Mechanism—A pivotal mechanism 18 controls the relative movement of the optical head assembly. The pivotal mechanism 18 may be a solid state assembly which comprises at least one of a piezoelectric or a magnetic element. Further, the pivotal mechanism can move the optical head assembly 12 along one or more axes. Referring to FIG. 3A, the optical head assembly 12 is moved by the pivotal mechanism 18 about an axis 100 such that the beams can be swept through a precise lateral arc 102 at a prescribed velocity. Referring to FIG. 3B, the optical head assembly 12 is moved through two axis. The second movement is up or down by the mechanism 18 about a second axis 106 which is orthogonal to the first axis movement 100. Alternatively, the assembly 14 may be moved in a two dimensional (coordinate grid) pattern (FIG. 1C) in conjunction with a radial movement of the head assembly 12. The movement of the optical head assembly 12 and the lens/detection assembly 14 enables the system 10 to read/write across multiple parallel data tracks at a high speeds for data retrieval/storage operations. The lens/detection assembly 14 movement is controlled by servo mechanism 17 which receives position feedback from solid state pivot 18. Referring to FIG. 3C, a directing lens 110 moves along a first axis 112 and a second axis 114 orthogonal to the first axis. In this embodiment, the optical head assembly and the lens/detection assembly can remain stationary.

1.4. Media Housing—Referring back to FIGS. 1A–1C, the system 10 stores/retrieves data from a non-rotational media 20 securely disposed in the media housing 16. The non-rotational media 20 is a high density, rewritable/erasable structure capable of storing large amounts of digital information. In one embodiment, the media 20 is securely fixed in a stationary position within the housing 16 during manufacturing of the system 10 and is therefore non-removable. As such, the media may be removed only by disassembling the system 10. The non-removable configuration has the following advantages: (i) the elimination of tolerances which are introduced into the system by mechanically fabricated loading assemblies; (ii) the capability to adjust positions to optimal performance during manufacturing; (iii) the repeatability aspects associated with fixed positioning; and (iv) the increased density of the media due to the previous three advantages.

In another embodiment, shown in FIG. 4, a non-rotational, removable media 116 is employed. The removable media 116 can be environmentally sealed and loaded directly into the housing 120. A mechanically indented receiving mechanism (not shown) draws the media into and ejects the media from the housing 120. Once drawn into the housing 120, the media is captured off the receiving mechanism by centering arms 122. A hand grabber 124 on each centering arm 122 is forked to secure the media 116 into a plane precisely parallel with the plane of the lens/detection assembly 14 and at a nominally prescribed focal point distance from the objective lens.

The centering arms 122 adjust the media within its two dimensional plane via a rotary or piston-like action so that the servo tracks are precisely parallel to the coordinate axis of the plane of the lens/detection assembly 14. Further, the plate is precisely positioned by optically reading corner datums 126 on the surface of the media 116 and adjusting the media position to a null point. The datums 126 are formed on the media 116 with reference to, but independent of, physical features of the media during the manufacturing process, and the servo tracks are precisely written on the media 116 in relation to the datums. Using the foregoing scheme, the initial positioning of the media 116 provides an overall tolerance within the system 10, such that the media subsequently requires minimal repositioning during read/write operations.

In another embodiment, a stack of recordable/recoverable, non-rotational, non-removable media is disposed in the housing 120, one above the other or adjacent to each other. The "stacked media" concept (or library) has been successfully used in the magnetic disk industry to concentrate and expand storage capacity in an individual storage device. In yet another embodiment, a non-rotational, non-removable, spherical or drum-shaped media with an inner and outer head assembly is employed.

Figure 5B:
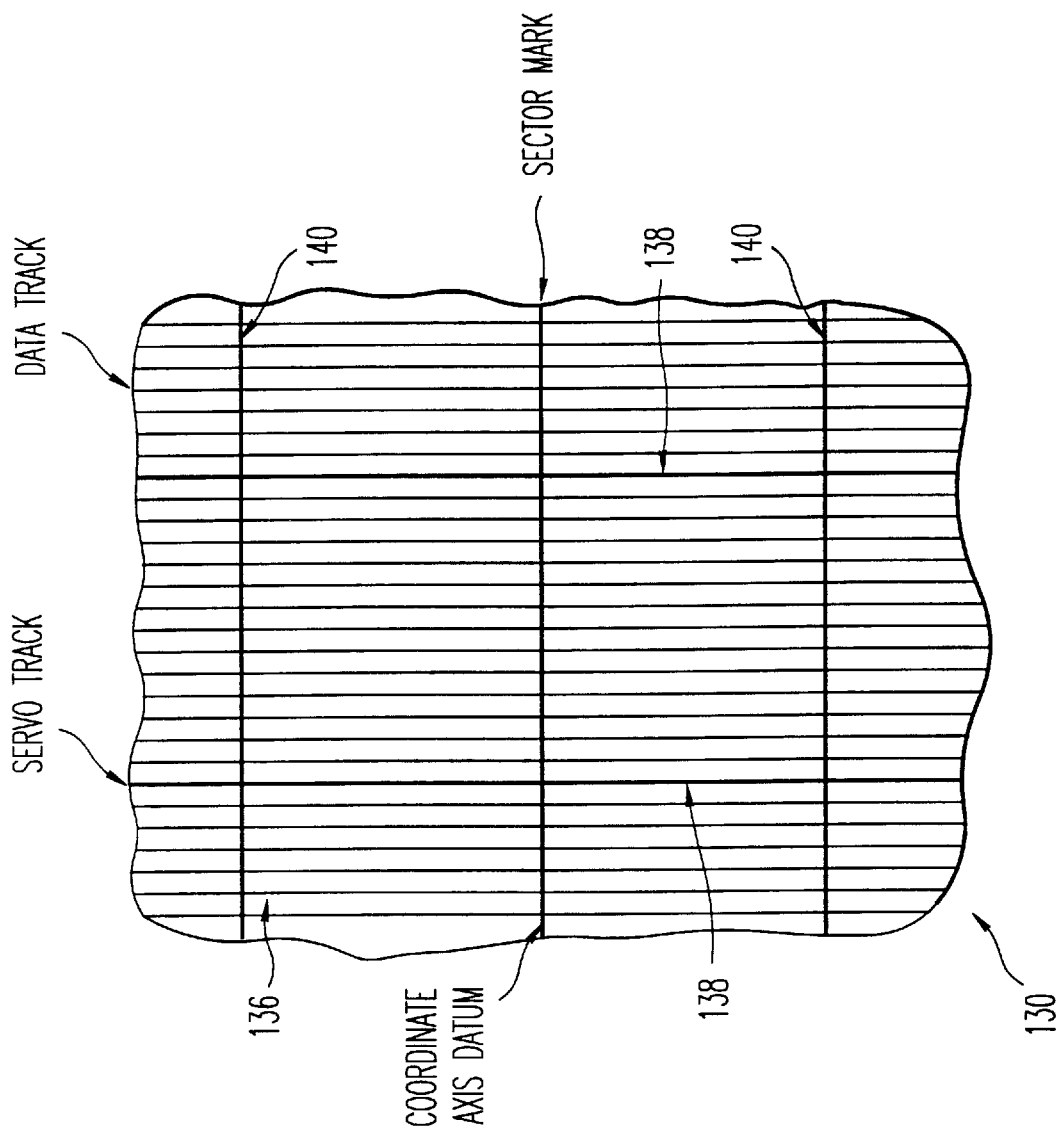
Figure 5C:
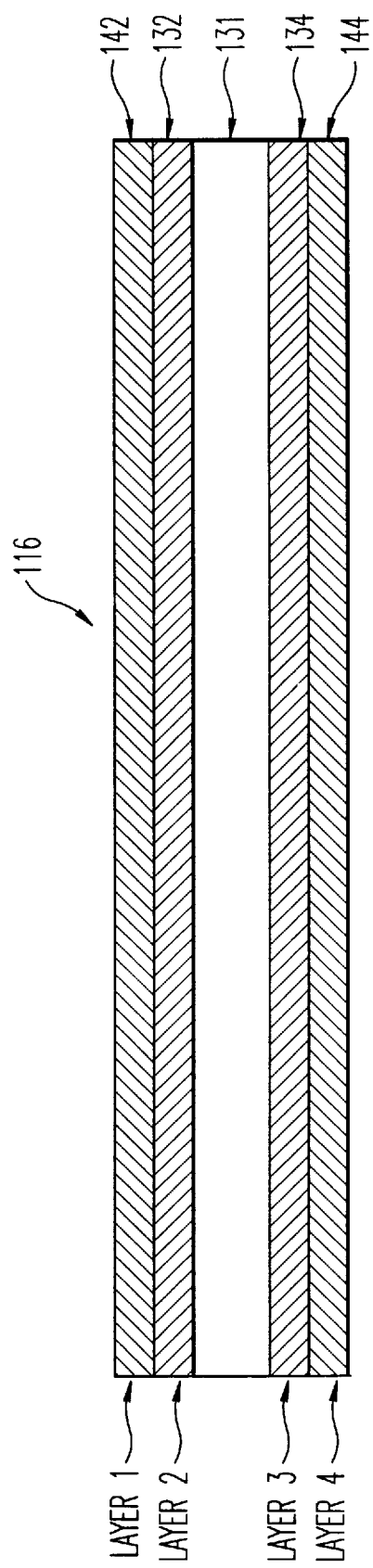
FIG. 5C–5E are cross-sectional illustrations of the media showing the reflective layers.

1.5. Media—Referring to FIGS. 5A–5C, the non-rotational media 116 is a high density, rewritable/erasable structure capable of storing large amounts of digital information. The media 116 has an open form factor based upon single cell zones 130 which can be defined (in number) to accommodate various storage requirements. Because the storage density limitations of known storage systems do not apply, the media 116 can be marked with denser marking patterns to provide an extremely high data storage capacity.

In one embodiment, the media 116 includes a substrate 131 having first and second surfaces, and two pairs of radiation sensitive layers 132, 134, 142, and 144 covering the first and second substrate surfaces. The radiation sensitive layers 132, 134, 142, and 144 reflect one or more incident beams of laser light from the surfaces. The layers 132, 134, 142, and 144 are partitioned to include a plurality of zones 130, which may serve as RAM memory zones and/or archival storage memory.

Each zone 130 includes a plurality of data tracks 136, servo tracks 138 and sector boundaries 140. The data tracks 136 are parallel, uniformly-spaced, linear data tracks marked on the layers 134, 136 by a write beam. Each data track stores data, in the form of marks and non-marks, having a prescribed reflectivity pattern, energy level and frequency range. The servo tracks 138 are parallel, linear written patterns that separate and dimensionally reference groups of data tracks 136. Each servo track 138 has a predetermined reflectivity pattern that distinguishes servo tracks from data tracks. The sector marks 140 are parallel, imperceptible borders transversely disposed relative to the data tracks 136 and servo tracks 138 and provide an indication of a boundary between adjacent groups of data tracks. That is, the sector marks, which may be 32 coded bytes wide, define each sector or segment of stored data. A segment is defined as a bus wide (i.e. 32 bits) set of sectored data tracks. Sector bytes, which begin at a sector mark, preface a data track sector and provide a timing pattern for eventual data stream synchronization on each individual track and synchronize data on parallel and remote data tracks. Sector bytes are also used for master timing of interleaved code words which are written across top and bottom layers on parallel data tracks.

Figure 5D:
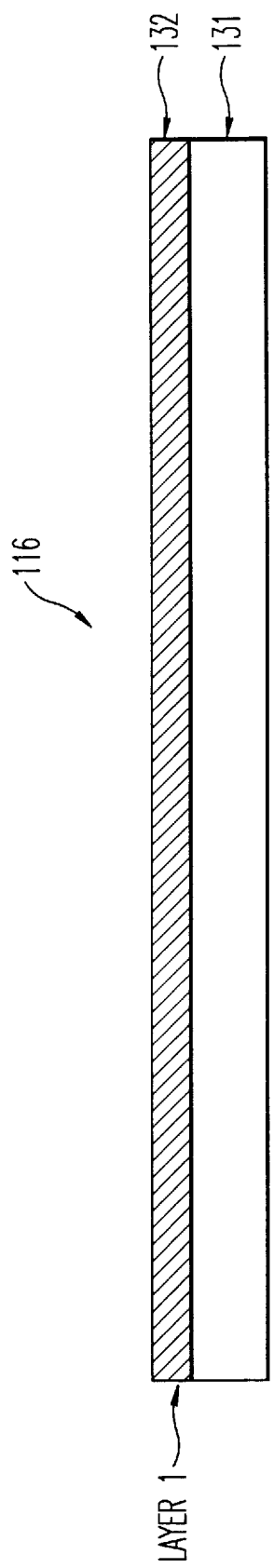
Figure 5E:
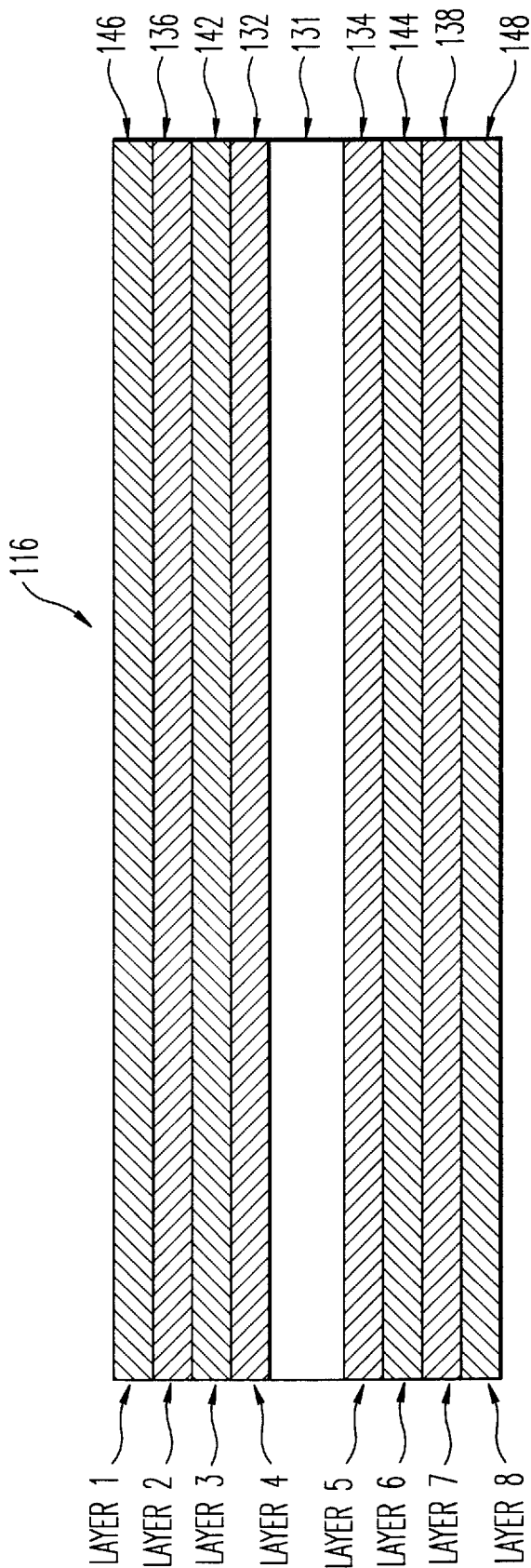

The media 116 may also include either a single radiation sensitive layer, FIG. 5D, or a multiplicity (greater than two) on either side of the substrate 131, FIG. 5E. These radiation sensitive layers are also partitioned into a plurality of zones, each having linear servo tracks, linear data tracks and linear sector marks transversely disposed relative to the servo and data tracks.

In the four layer embodiment, the second pair of layers 142, 144, data tracks are offset from the first pair of layer's 132, 134 data tracks. This placement pattern maximizes the use of the physical surface geometry of the media 116. Also, the placement pattern minimizes reflected pattern noise from the second pair of layers when reading the first pair of layers. In embodiments having greater than four layers, the data tracks on each layer are located immediately below the data tracks on the adjacent upper layers.

In one embodiment, each zone can store at least one gigabyte of data. In another embodiment, each zone can store at least two gigabytes of data. Each data track on the media may have a width of about 0.5 microns (or less), and the data tracks may have a track pitch of about 1.0 microns (or less). Servo tracks have a width of about 1.0 microns.

The media 116 can have a rectangular flat shape. In this embodiment, the track format follows the rectangular shaped outline of the media. In other words, a Cartesian coordinate system is employed for the tracks instead of the polar coordinate grid used for rotating disks. Servo tracks 138 are used to align the read/write beams with respect to the data tracks 136 and also to separate bands of data. For example, one approach involves centering a servo track with parallel data tracks to either side of the tracks. Another example involves a single servo track centered within the media. Groupings of parallel data tracks are located on either side of the servo track. These groupings extend out to the limits of the scanning capability of the lens/detection assembly.

While there have been prior attempts to develop certain types of flat optical media, most efforts have been directed to a rewritable "wallet sized" optical card for personalized identification and financial services. These efforts are not directed to mass storage and are unrealistic for such uses due to severe limitations in data storage capacity.

1.5.1. Sizing—The size of the media is open ended. The media may be rectangular and sectioned into one or more generally rectangular zones. The dimensions of a zone are constrained by two different factors. First, the length of a zone is theoretically unconstrained except for the length of the bed upon which the media is disposed within the confines of the housing. Second, the length of a sweep across a zone which can be realistically covered by a single head and lens/detection assembly and the economic limitation of ganging this combination in multiples down the length of the plate limits the dimensions of the zone. The width of the zone is defined by the maximum aerial coverage of the lens/detection assembly when disposed over the media.

1.5.2. Media Material—The media 116 can be a rewritable (i.e. erasable) material. Suitable materials have a high sensitivity and a low power requirement per unit area. One preferred media material is a phase change material. This material reacts to surface heat, such as generated by lasers, by changing between an amorphous state and a crystalline state.

Alternative materials include an Electron Trapping material and a CD-ROM photorefractive material. Both materials are conducive to phase modulation and require substantially less power to change state that does phase change materials. The latter material is light sensitive and is used in a holographic storage technique which facilitates mass storage and fast data access rates. An advantage to using these materials is that they allow for storage of multiple bits within a single mark as compared to the current single bit/single mark storage of phase change materials.

Figure 6:
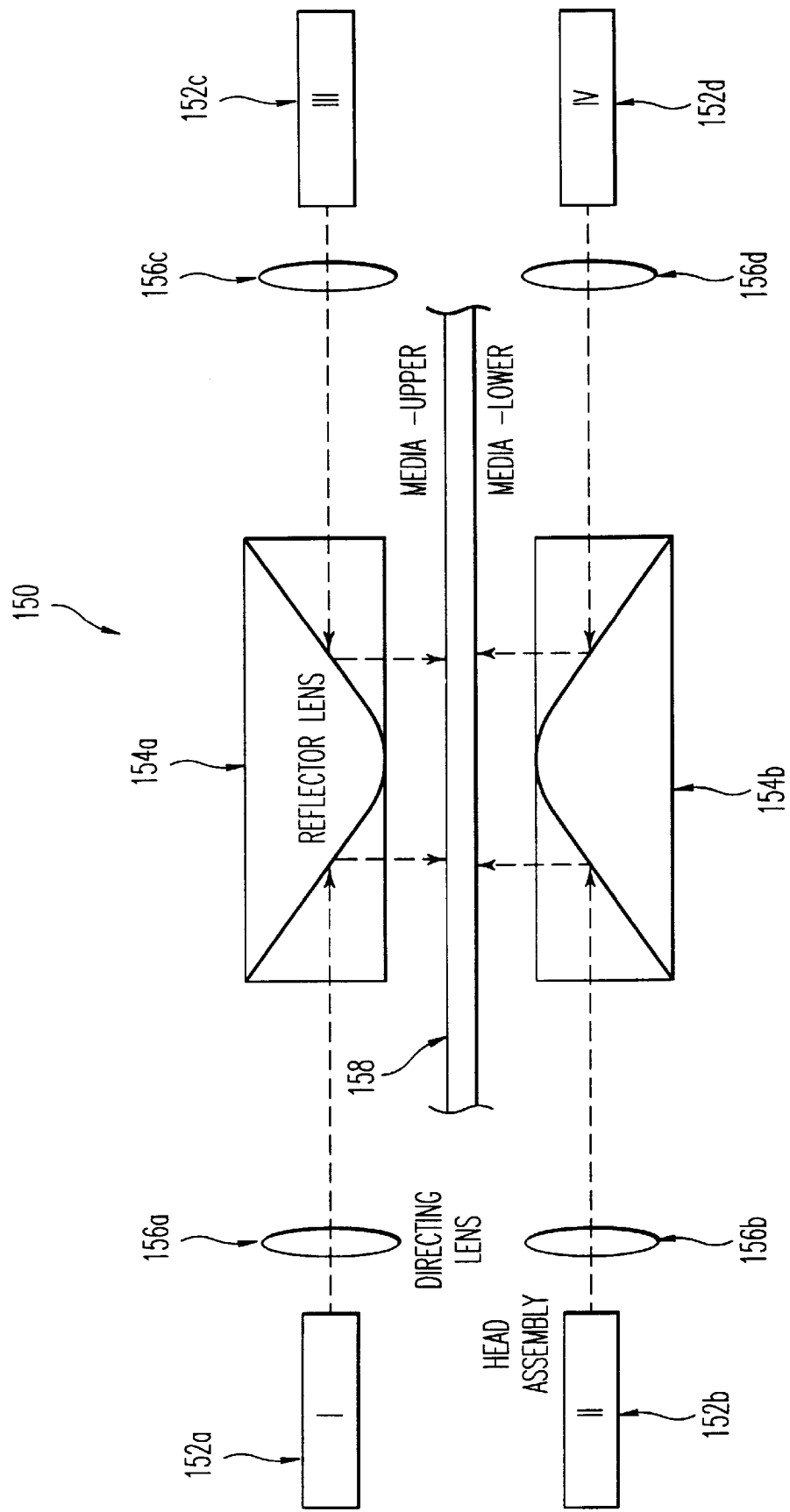
FIG. 6 is an illustration of a multiple head mass storage system incorporating the principles of the invention.

1.6. System Operation—The mass storage system can employ a single head and lens/detection assembly or concurrently engage multiple assemblies. Referring to FIG. 6, the mass storage system 150 includes four optical head assemblies 152a–152d and two lens/detection assemblies 154a–154b. Four movable directing lenses 156a–156d enable the head assemblies to read/write to various data tracks on the two-sided media 158. These assemblies, all acting in concert, will concatenate the four sets of eight track parallel outputs into one read/write channel to produce a 32 bit wide data word.

Referring to FIG. 7, one or more of these memory devices 10 can be configured to operate in a variety of environments. For example, the system 160 can be utilized in a personal computer, a computer workstation, networks, and main frame lineups. Each of these hardware configurations have different I/O and internal bus protocols which must be accommodated for the system(s) 160 to function.

The individual sketches in FIGS. 7A–7F represent the potential use of the devices 10 in a mass storage system. The memory devices 10 can of course have uses in other fields. FIG. 7A illustrates the use of the device 10 in a personal computer or workstation 161, wherein the media is removable. The media form factor can be reduced or increased depending on application. FIG. 7B demonstrates that the device 10 may be hardwired/cabled/fixed to a personal computer or workstation 162 as the primary storage device (RAM and Archive). Further, the unit may be optionally provided to an existing unit as an add-on drive. FIG. 7C describes the point that multiple units may be attached to a PC/WS through the controller within a computer 163. It is intended that these units be one to one replacements for normal peripherals added to the CPUs and would require no bus modifications or internal CPU changes.

FIG. 7D illustrates a system 164 which is an extension of FIG. 7C. It demonstrates that the internal parallel bus of the PC/WS can be extended externally, thereby adding the RAM memory feature of the device to the CPU via external units. FIG. 7E illustrates several interconnected networks 165 with independent servers. One network depicts the device as an intelligent free standing unit, capable of servicing the memory demands via the server to which it is appended. The other network (with the PC/WSs) depicts CPUs which may have devices attached with the various options shown in FIGS. 7A–7D. As described within the text, files may be transferred between these various devices via a myriad of commands and methods. FIG. 7F illustrates a system 166 configured herein is the "Main or Mini frame" standard lineup of storage devices. The device is shown substituted for an normal archival style drive. This lineup would incorporate the "dual port" feature described within the text.

1.6.1. Input/Output—To accommodate the various system configurations, the memory device is either hardwired or programmed for each option, or capable of reacting to various options as each file is presented to the device via a network or lineup. The memory device may employ a unique internal protocol/addressing language, translate the incoming formats/structures from the host/servers to that native language, and translate outgoing information to the formats/structures of the requesting host/servers from the native internal protocol. These translations are accomplished via software programs. The various possible protocol conversion sequences are stored within the device.

The device's parallel and concurrent read/write operations significantly elevate the data access rates. In order to deliver this abundance of data to the calling system, the device's input/output characteristics must be equivalent or superior to the internal input/output rates. To accommodate this objective, the device Input/Output buses will be high speed architectures, such as SSA©, Ultra SCSI©, Firewire©, for the serial I/O ports, and PCI© and Fast ATA© for CPU buses.

As described previously, the memory device offers the capability to store both RAM and archival data on a single media at an archival storage price but at RAM speeds or better. The device also has the capability by receiving data into or recovering data from either a RAM or archival storage format and internally transferring data files between the two formats in either direction. The system may further provide the capability to transfer data files within each storage format, such as to change address locations, to balance file loading within a particular head assembly group.

Figure 8:
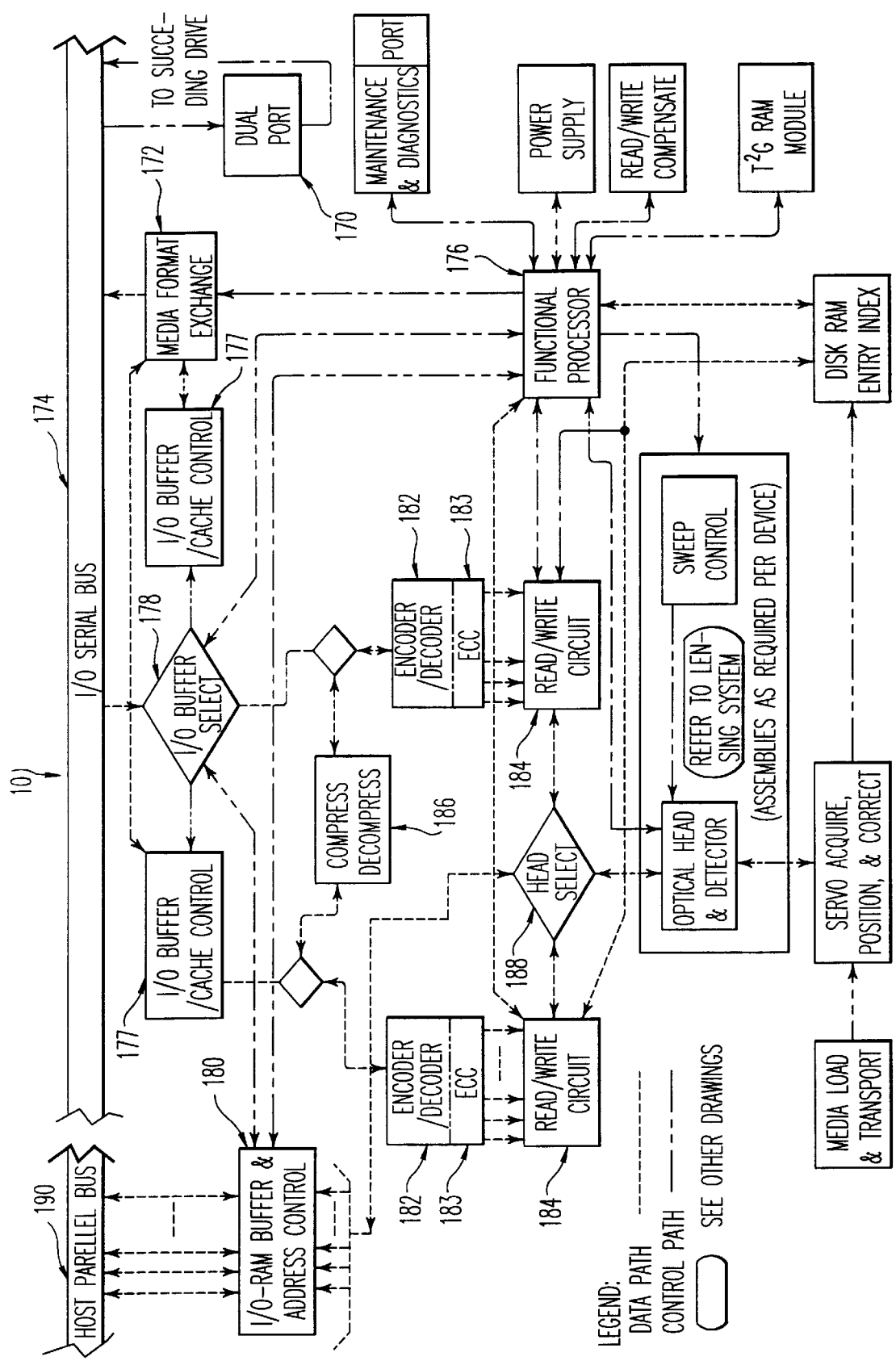
FIG. 8 is a detailed functional block diagram of the input/output operations of the mass storage system.
Figure 9:
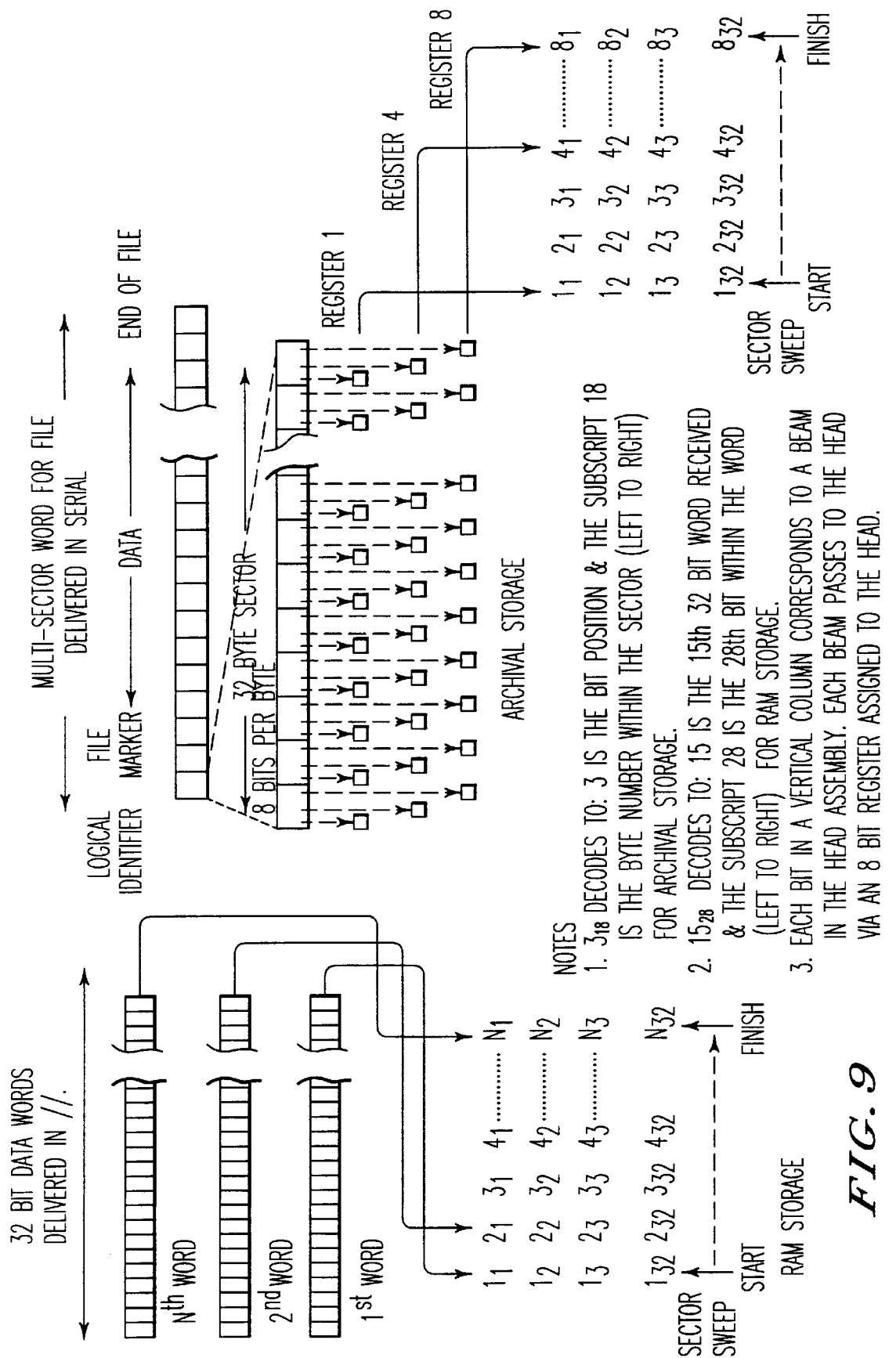
FIG. 9 is a detailed illustration of the encoding/decoding scheme for the mass storage system.

FIG. 9 is a functional block diagram illustrating the manipulation of serial and parallel data formats between receipt and storage of files within the device. Each area of input/output for the system 10 is addressed in the following four sections. (see FIG. 8).

1.6.1.1. Dual Port—Although a device will hold a large amount (e.g., at least one gigabyte) of data, a dual port module 170 is provided to connect additional devices together to form a ganged storage system. Dual porting assures that "head of string" bottlenecks do not inhibit the immediate passage of data to a downstream memory unit.

1.6.1.2. Format—As noted previously, the system may be used in a variety of environments, such as a local network with telecommunication interfaces (i.e. webs) to foreign CPUs and Nets. Thus, a media/format exchange module 172 is provided for storing an input data file formatted in a unique foreign protocol. The module 172 is directly connected to the I/O serial bus 174 for receiving the input data file from an external device. The module 172, with the assistance of the functional processor 176, recognizes the unique foreign format file, converts the data in the file to a native file format, sends the converted file (via the I/O buffer) to memory in the native format with flags embedded in the stored file indicating the unique foreign format. Upon receiving a retrieve stored data command from an external processor, the module 172 re-converts the native data file format into the foreign format identified by the processor. Alternatively, the module may output the stored data file into other (different) foreign formats. Significant cache memory is required to accommodate this feature.

1.6.1.3. I/O Buffer/Cache Control—The I/O buffer/Cache Control module 177 utilizes an I/O buffer selection circuit 178 to monitor the I/O bus 174 for incoming file storage requests. An incoming request is first examined to determine the action to be taken, such as the following which are listed in priority order: (i) an internal file transfer from archival memory to RAM; (ii) storage in RAM of an incoming serial file from the I/O serial bus; (iii) archival storage of an incoming foreign file; and (iv) archival storage of a native file. The circuit 178 checks availability of a read/write path from the multiplicity provided and reserves a path to process the request with the assistance of the functional processor 176.

A file transfer operation from archival memory for storage in RAM only requires internal file migration. The functional processor 176 locates the file to be moved in archival memory and the RAM memory location where the file is to be transferred with the assist of the I/O Ram Buffer/Address Control module 180. The file is read into the encoder/decoder circuit 182. The circuit 182 strips the error correction codes and passes the data back to the Read/Write circuit 184 in a parallel format. The data is written to memory (RAM reserved) from the read/write circuit 184 in the format dictated by the I/O Ram Buffer/Address Control circuit 180 via control of the functional processor 176. Before the actual data transfer begins, however, the functional processor 176 notifies the I/O Buffer Selection circuit 178, which places a request acknowledgment on the I/O Serial bus 174 indicating that the action is beginning and the address of the RAM memory location. When the transfer is complete, the I/O Buffer Selection circuit 178 notifies the requesting processor and un-reserves the reserved channels. This action may place a priority interrupt on the system, causing an archival storage write request to be interrupted if it has not begun the write process. Alternatively, an archival read request may be interrupted in midstream if no available read/write path was found by the I/O buffer 178. In either event, the I/O Buffer Selection circuit 178 enacts the interrupt and places a re-request out on the I/O serial bus 174 to the interrupted sender (CPU).

The operation of storing an incoming file in RAM from the I/O serial bus 174 closely resembles the previous operation except that the data file is input into the system by the I/O Buffer Selection circuit 178 and I/O buffer control 177 in a format that conforms to the native protocol. The file is routed under control of the functional processor 176 to the encoder/decoder 182 and then to the Read/Write circuit 184 for decryption and serial to parallel conversion (refer to FIG. 9). The parallel file is written to RAM memory in the format set by the I/O RAM Buffer/Address Control module 180. The I/O Buffer Selection circuit 178 sends I/O bus notifications as described above in addition to standard "stop/start" indicators.

For both of the above-described operations, the read situation follows the reverse path, except that (i) data being read back into the system's archival memory must be passed through the encoder/decoder 182 for encryption, and (ii) data going out on the I/O Serial bus 174 must be serialized in the Read/Write circuit 184 and formatted for the requesting processor by the format exchange circuit 172.

The operation of archival storage of an incoming foreign file is somewhat similar to the conversion process described in the "Format" section. The I/O buffer selection circuit 178 detects an incoming file request that requires a format conversion. The circuit instructs the I/O bus 174 to receive the data file into the Media/Format Exchange circuit 172. After conversion, the file is passed to the I/O Buffer/Cache Control circuit 177 for normal storage processing via the encoder 182/183 and the read/write circuit 184.

The fourth operation is similar to traditional storage and retrieval routine requests coming in from a serial bus for data files already in the system's native format. The circuit 178 detects a file request on the bus 174, checks the appropriate paths for availability and marks the paths reserved. The circuit 172 places a "send" request on the I/O bus, receives the file and routes the file to the reserved I/O Buffer/Cache Control circuit 177. This circuit 177 performs the function of matching the speed of the I/O serial bus 174 to the internal processing speed of the system and segments the file into manageable portions sequentially passed into the system (see FIG. 9).

Because the system can be used in various environments, the system is highly susceptible to receiving and sending compressed and decompressed files. These functions require a substantial amount of time, so the compression/decompression module 186 may perform such functions off-line from the critical path. Incoming compressed files designated for RAM are automatically decompressed. Files for archival storage are stored in the compressed state, unless otherwise requested by the sending processor, in the native format of the system with a compression flag activated. The system periodically searches for compressed stored files and ascertains whether the files should remain compressed. Files requested by an external processor are sent out on the I/O Serial bus 174 in a uncompressed state unless otherwise requested.

The compression/decompression module 186 detaches itself from the standard Read/Write channel and operates independently until its function is complete. On completion, the module 186 requests a path from the I/O Buffer Selection circuit 178 for a storage route or an 1/0 exit route for the file. If the file is to be stored it is passed to the encoder/decoder circuit 182, which segments the data stream to be stored. The encoder/decoder circuit acts in concert with the ECC module 183 and Read/Write circuit 184 to encode the file, write the file to (RAM or archival) memory on the media, and verify the integrity of the written data. The functional processor 176 assigns the storage address and causes the head selection circuit 188 to route the data into the proper head assembly(s) and initiate the pivot mechanism(s) to write the data to the media. The Read/Write circuit 184 converts the encoded data from a serial to parallel and assimilates bit sets (bytes) into word groups conforming to required bus widths. (e.g., thirty-two bit words from four synchronized heads).

Files are retrieved from the media by first locating the file on the media using, for example, a table that cross references the file name to the address. The functional processor 176 initiates a parallel scan of the media at the specific address. The data is passed to the Read/Write circuit 184 for decoding and reassembly, and then passed to the I/O Serial bus 174 via the I/O Buffer Selection circuit 178.

1.6.1.4. I/O RAM Buffer/Address Control—Host processor storage/retrieval requests come directly into the device via the internal Host Parallel bus 180 (i.e. a PCI interface). Upon detection of a request, the I/O RAM Buffer/Address Control module 180 notifies the I/O Buffer Selection circuit 178, which reserves a path to a RAM location on the media. The request triggers a priority interrupt, if necessary, to open a path. The I/O RAM Buffer/Address Control module 180 passes the RAM memory address to the functional processor 176. The functional processor causes the Head Selection module 188 to open a path to the proper head assembly(s) and to initiate the pivot mechanism(s) for writing the parallel data being passed by the I/O RAM Buffer/Address Control module 180. The Read/Write circuit 184 directs the parallel data to the proper head, tracks the order of writing (of multiple heads) and returns the head ordering information to the I/O RAM Buffer/Address Control module 180 for storage.

1.6.2. Read/Write—The Read/Write circuit directly controls the parallel storage/retrieval of an eight bit word through the manipulation of an optical head assembly. For multiple head systems, the circuit can control up to thirty-two bit words through the manipulation of up to four heads acting in synchronization. Further, a bus expansion feature is provided wherein multiple read/write circuits may act in concert to store or retrieve wider bus words (i.e. 64, 128, 256, etc.)

In one embodiment, two redundant, yet separate, Read/Write circuits 184 are employed to ensure fast storage/retrieval of files for the system 10. Also, transfers into/out of RAM from the various external processors dictates that multiple read/write access into the system is valuable. The path to the individual heads is selected and routed via a head selection circuit 188 operating with the functional processor 176. RAM files are processed from parallel bus 190 through this circuit 188, whereas archival files are routed from the I/O bus 174 through the Read/Write circuit 184.

The encoding/decoding and error correction techniques can be described in connection with FIGS. 8–9. A sector of the serial archival file is brought into the encoder/decoder module 182 for error correction and encoding. However, the encoded sector is run through a parallel to serial register (as are the channel words with the entire file) to pick off the Nth position bits within each byte and to separate the eight sets. Each of these eight bit sets is sequentially fed into four serial to parallel registers, such that the 32 bit set is placed uniformly across the four.

The bit cell in each register is tied into the blanking circuit in the head assembly. The bit value causes the circuit to attenuate or pass a beam to the lens/detection assembly for eventual writing of the data on the media. The clearing and reloading of these four registers with the next set of 32 bits is synchronized with the pivot mechanism coupled to the head assembly. As such, the next bit set of data is available to be written on the media and the light sources are fired when the head passes into the second write position for the media.

RAM storage data is provided on the Host Parallel bus one word at a time. Because this data does not require encoding or error correction, it is immediately transferred into memory once the memory address is determined and provided to the sending processor. The appropriate entry point for this data is the serial to parallel registers associated with the RAM head assemblies. The file locations of the serial archival files and RAM files are stored in a table of contents on the media and located by way of the functional processor.

The data is read/written to a low power, highly sensitive media. As such, the electrical signal strength for reading to/writing from the media is proportionately low. The low signal strength and media write sensitivity are countered by the use of a Write Power Calibration circuit and associated software. This circuit adjusts the power of the write head assembly after dynamically testing the media sensitivity, and also adjusts the electrical threshold value of the read signal in proportion to the write adjustment. Other circuits may be used to clearly distinguish data in this high density and low signal strength environment. For example, one circuit regenerates the data after first separating the signals from circuit noise and other offending voltage biases. Another circuit assures the integrity of the data pulse timing even though the read beam may vary from true center to its extreme tolerance.

1.6.3. Media Scanning Scheme—The invention contemplates several methods of reading/writing data across the length and width of the media. In one embodiment, the method requires that multiple optical head assemblies be positioned on opposing sides of the media such that the entire surface area of the media can be swept by the optical head assemblies. The surfaces of the reflector/splitter assemblies are sufficiently large to cover the same surface area of the media to be swept as does the optical head assemblies.

Each optical head assembly sweeps across the media in an arc for reading/writing to multiple segments of the media bounded by servo tracks and sector marks (a zone). Each segment includes two or more sets of eight data tracks. The read/write beams can be redirected from one set of eight tracks to another set by moving the scan beams up or down the surface of the splitter by tilting the head assembly, tilting the directing lens or moving the lens/detector 14. The number of segments within the boundary limits of each head assembly depends on the arc or sweep limit of the head assembly, the length of the segment, the surface area of the splitter, the depth of field of the beams, and the distance the head is from the media. The number of segments per each head assembly or reflector lens is not fixed.

Figure 10C:
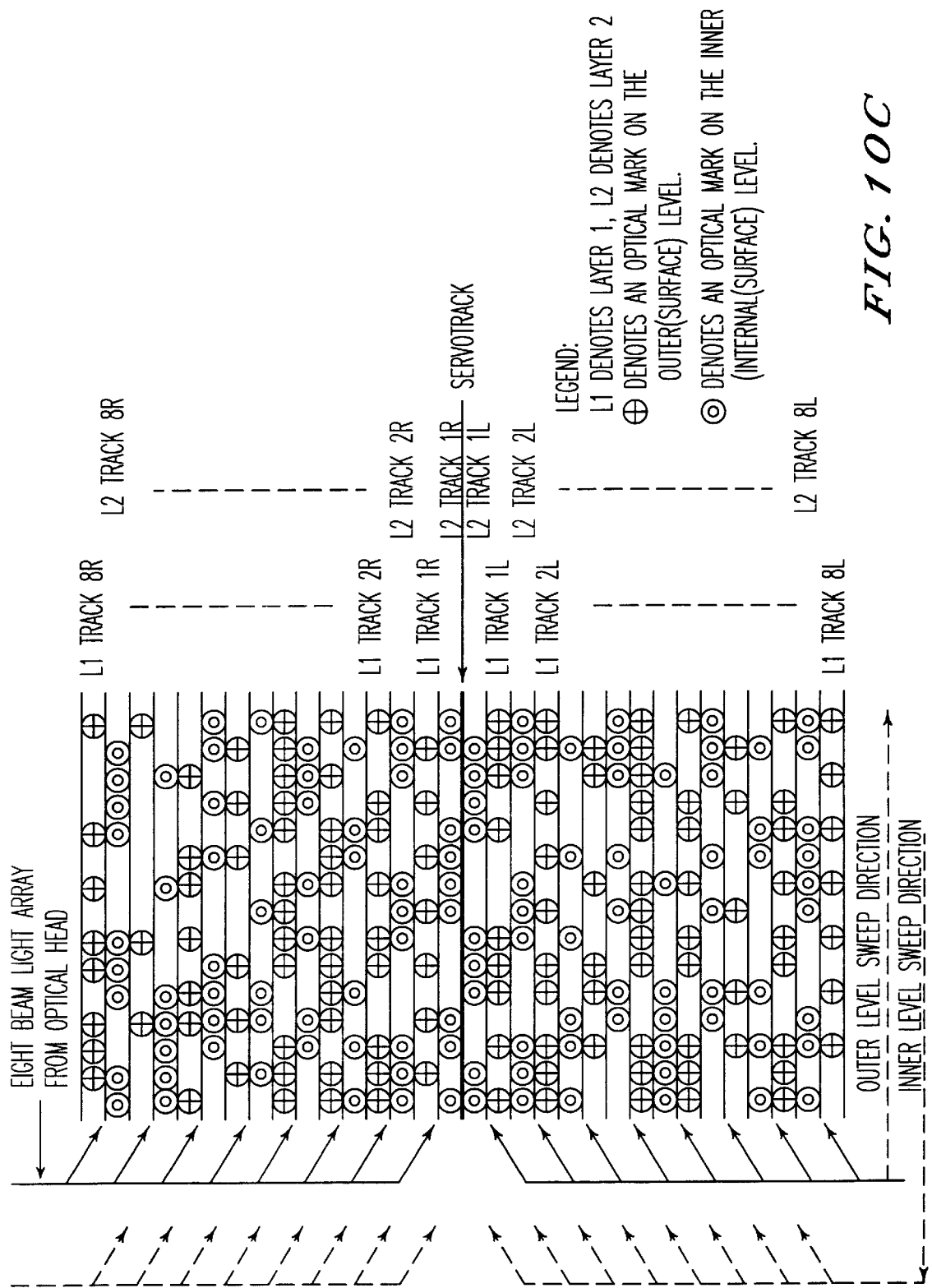
Figure 11:
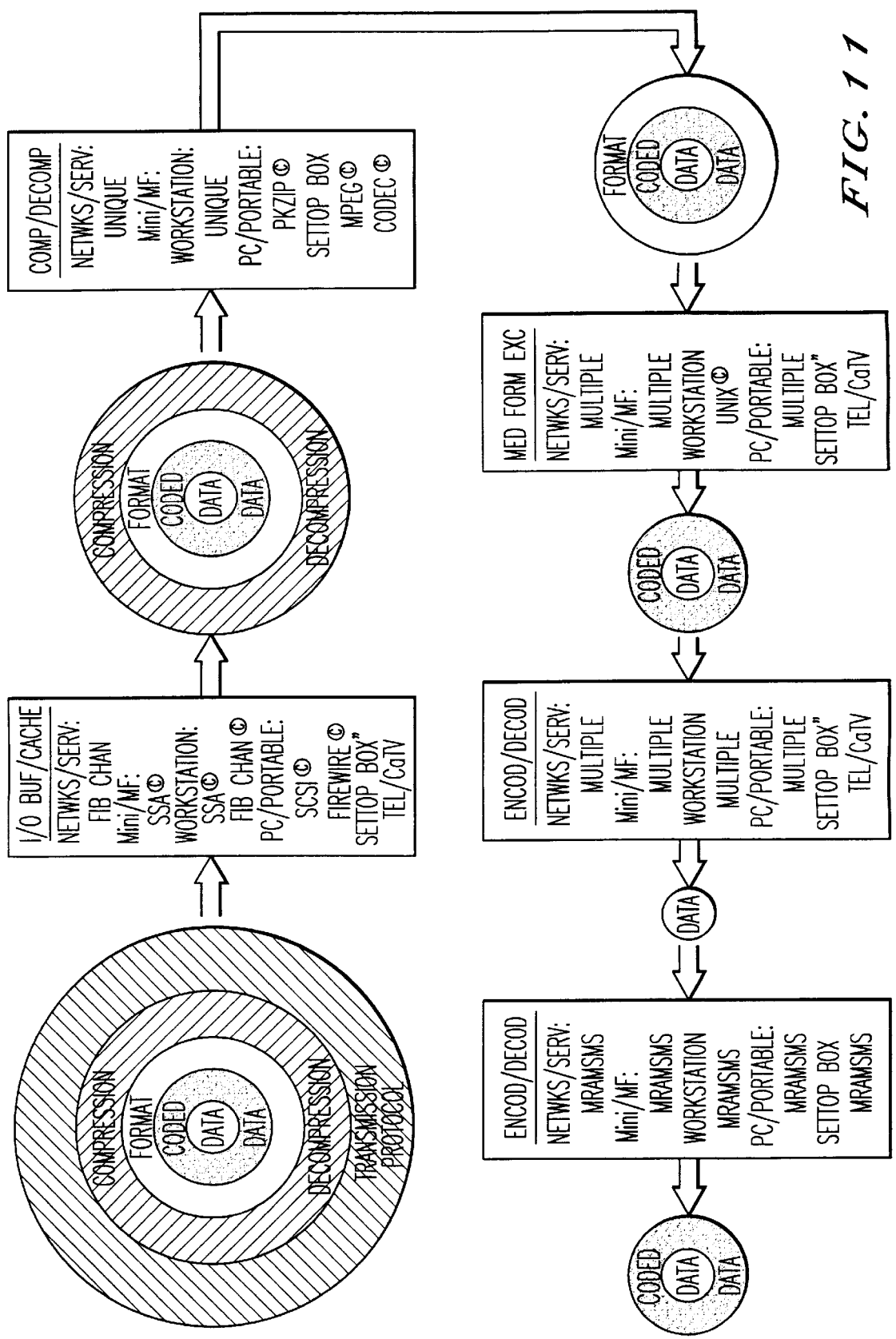
FIG. 11 is a detailed flow diagram of the input/output encoding/decoding operations for the mass storage system.

Referring to FIGS. 10A–10D, the pivot mechanism limits the movement of each head assembly and also suggests a recording pattern or sequence. Motion in two directions serves to position the read/write beams on the tracks. First, the pivot mechanism sweeps the head assembly through the limits of its arc. Second, a servo mechanism moves the splitter or the directing lens. FIG. 10A illustrates two possible recording patterns for single or two sided media. For four layer offset media, FIG. 10B depicts a head movement efficient read/write pattern. The track format will include "jump to," "start of file," and "end of file."

The read/write format may operate under the following guidelines:

1. A sector is the minimum portion of the media which can be dedicated to a file.
2. A segment is defined as an area (i.e. space) comprising the length between two sector marks and a width of sixteen data tracks.
3. Sectors and segments are subdivisions of a zone.
4. Data on one media layer can only be written/read in one Cartesian direction on sequentially adjoining segments. The adjacent adjoining segments is written/read in the opposite direction.
5. The writing of a data file may begin at a segment anywhere within the field of view of a specific head assembly, but then continues, uninterrupted to the last segment within the field of view and then onward through sequentially adjoining segments until the file is completely written or until the file must be linked to another head assembly field of view. The software priority shall be set to place a file within one complete field of view.
6. The data to be written on the media field of view of all four head assemblies which comprise the 32 bit word (left and right above plate and left and right under plate—per FIG. 6) shall be written so that the storage patterns on the media field are identical causing the heads to operate in unison they cross equivalent sector marks simultaneously when reading the data back.
7. Either the inner (second and third) or outer layers (first and fourth) of a four layer media may be used to store a file in the read/write cycle without preference. The inner layers are be swept in the direction opposite to that of the outer layer.

The scanning system may include one or more of the following options. First, the placement of head assemblies adjacent to each other on the same side of the media for covering immediately adjacent segments may results in an inefficient beam coverage pattern. As such, head assemblies may be placed on alternate sides of the media so that the angular emitted beam patterns coincide and possibly overlap slightly. This solution improves beam coverage efficiency by one-hundred percent.

Second, in certain embodiments, it may be advantageous to store only eight or sixteen bit words as opposed to the 32 bit words. This storage technique would require a change to the standard memory pattern used in a four head system. One solution is to use eight or sixteen bit words only in specific areas on the media.

Third, certain protocols require storage or manipulation of greater than 32 bit words. One example is the IEEE Future-Bus© which can expand from a base 32 bit bus up to a 512 bit bus. One method of accommodating larger word lengths is to have multiple sets of 32 bit assemblies acting in parallel to simultaneously read/write the extended word. To implement this feature, additional Read/Write circuits are added to accommodate the word size and synchronized to act in unison to locate/find and assemble/disassemble the extended words.

An alternative scanning scheme involves positioning head assemblies to the side of the media. The lens/detection assemblies, rather than being fixed above the media, move in an indexed fashion to positions over the media surface adjacent the file to be read/written. It is believed that this approach requires fewer reflecting surfaces, possibly fewer head assemblies, and the direction lens may possibly be eliminated.

Because of the inherent movement of a beam across the splitter, the angled reflection distorts the circularity of the beam as the beam angle moves away from a perfect orthogonal position. Two areas affect this distortion. The primary one is the splitter being off angle to the head assembly, and the second one is the radial relationship between the directing lens and the splitter. To compensate for this distortion, the reflecting surface of the splitter is configured in the shape of a two-dimensional parabola contoured to compensate for the sweep of the beam in either a vertical or horizontal direction. Another way to mitigate this distortion, which can be used in addition to the parabolic shaped reflecting surface, involves (i) reducing the diameter of the beam below that of the media mark and (ii) restraining the sweep angles to hold the beam diameter distortion below the mark to mark separation.

1.6.4. Error Correction and Detection—The archival data moved through the system undergoes several check stations. First, data to be archived entering the system via the I/O buffer is checked for proper transmission reception. The integrity of the transmission is verified by running checks with embedded parity bits placed within the transmitted file to an industry recognized standard. The drive software recognizes and performs standard transmission error checking protocols on files coming in off the I/O Serial Bus. Also, software options are provided to add error recognition and checking programs unique to a specific host processor or controller. Incoming data transmissions which do not pass the appropriate checks are rejected, and a request to retransmit the data sent to the sending processor.

Once the data file has passed the I/O buffer and data transmission error check and the parity bits stripped off, the decoded data is passed to a buffer in the encoder/decoder circuit in a fixed multi-byte segment. The encoder/decoder circuit encodes the data into a format employing re-synchronizable data sectors and a multiple error correcting RLL (Run Length Limited) code.

A viable high speed alternative, involves the use of Viterbi coding techniques (i.e., Probable Response Maximum Likelihood (PRML). PRML is a technique which allows a magnitude increase in the error detection and identification speed, with current rates on the order of a 100 megabytes/sec. Another alternative involves the use of a broad range of error detection and correction schemes, such as the Hamming code and other RLL integer limits other than 2,7.

The encoder/decoder circuit causes the encoded sector to be interleaved to the sector's multiple number of command words (i.e. 32) which are subsequently written to the media in a parallel fashion. To verify that the data was written correctly, the written sector is then read backwards, the information inverted, the ECC coding removed and the raw data compared to the original sector fed into the ECC buffer. Incorrect sector information is re-written and re-read until it is written properly.

Information read from the disk is passed through the same encoder/decoder circuit and checked for parity errors. If errors are discovered the data is corrected within this same circuit. Corrected or un-corrected data is passed to the I/O buffer after the encoding information is removed from the data.

Information coming into the device from the Processor Parallel Bus is exclusively for RAM storage and has optional, specifically designated areas on the media. Because the data is connected into the processor's main bus and requires immediate response, no transmission or DRAW (Direct Read After Write) error checking is conducted.

1.6.5. File Compression—The system has the capability to compress or decompress either files entering, leaving, or resident within the system on command. This function is not available for files not having or seeking residency in the system.

Available methods for compressing/decompressing files ranges from bulletin board available software algorithms (e.g., "PKZIP"©) to custom coder/decoder (CODEC©) chips with specially embedded software. As such, the compression/decompression capability of system not only requires storage and availability of select software programs, but also the integration of custom chips into the decoding functions.

File compression has various concentration ratios dependent on the method used to achieve compression. Ultimately, a significant amount of time is required to compress/decompress a file, and the expanded file may be from 4 to 12 times the size of the original file. Because of the time factor, a detached compression/decompression function, rather than on-line, is employed in the system. Also, a significant amount of both RAM and archival space must be available to perform the function and to store the results of that performance. The availability of the storage area provided by the RAM module for this system is believed to be unique and important to offering this open ended feature.

Within the system, the compression/decompression function is shown at the serial entry/exit point, but accessed only through an optional decision block after the I/O buffer. A file is only routed into the compression/decompression module upon request when the file is entering or leaving the system. Once decompressed, the file is relocated on the media. The decompressed file includes a flag indicating the original compression technique, so that it may be outputted in the same pattern as it was inputted.

EQUIVALENTS

While the invention has been particularly shown and described with reference to specific embodiments, it should be understood by those skilled in the art that various changes in form and detail may be made therein without departing from the spirit and scope of the invention as defined by the appended claims.

What is claimed is:

1. A mass storage system comprising:
   a) a housing for securing a media in a stationary position;
   b) an optical head assembly including (i) first and second light sources generating read and write beams, and (ii) a lens assembly for splitting each of the read and write beams into a plurality of parallel read and write beams;
   c) a lens/detection assembly optically coupled to the optical head assembly and including (i) an angled beam splitter for directing the plurality of parallel read and write beams to the media for simultaneously reading multiple tracks of data therefrom or simultaneously writing multiple tracks of data thereto, and (ii) a diverging lens for directing a plurality of reflected read or writ beams received from the media to a photodetector; and
   d) a solid state pivotal mechanism for controlling the relative movement of the optical head assembly and the lens/detection assembly.

2. The mass storage system of claim 1 wherein the lens assembly comprise a beam splitter/combiner lens for combining the read and write beams, and a diffraction grating lens for splitting the read and write beams into a plurality of parallel read and write beams.

3. The mass storage system of claim 1 further comprising a beam expander assembly for re-focusing the plurality of parallel beams received from the lens assembly to an extended focal point located at the lens/detection assembly.

4. The mass storage system of claim 1 further comprising a non-rotational media securely disposed in the housing, the media including RAM memory zones and archival storage memory zones.

5. The mass storage system of claim 1 wherein the solid state pivotal mechanism comprises at least one of a piezoelectric element or a magnetic element.

6. The mass storage system of claim 1 wherein the solid state pivotal mechanism moves the optical head assembly along a first axis.

7. The mass storage system of claim 6 further comprising a directing lens that moves along a second axis orthogonal to the first axis for controlling the movement of the plurality of read and write beams along the second axis, wherein the solid state pivotal mechanism moves the plurality of read and write beams along the first axis.

8. The mass storage system of claim 1 wherein the solid state pivotal mechanism moves the optical head assembly along a first axis and along a second axis orthogonal to the first axis.

9. The mass storage system of claim 1 wherein the solid state pivotal mechanism moves the optical head assembly along a first axis and a servo mechanism moves the lens/detection assembly along a first axis and a second axis orthogonal to the first axis.

10. The mass storage system of claim 1 wherein the first and second laser light sources each comprise at least one gas or diode laser.

11. A mass storage system comprising:
a) a non-rotational media securely disposed in a housing in a stationary position, the media including RAM memory zones and archival storage memory zones each having linear servo tracks, linear data tracks and sector marks within each data track providing an indication of a boundary between adjacent groups data tracks;
b) an optical head assembly including (i) first and second laser light sources generating read and write beams, (ii) a beam splitter/combiner for combining the read and write beams (iii) a diffraction grating lens for splitting the read and write beams into a plurality of parallel read and write beams, and (iii) a pivotal mechanism for moving the optical head assembly about a first axis;
c) a directing lens, optically coupled to the optical head assembly, moving along a second axis orthogonal to the first axis for controlling the movement of the plurality of read and write beams along the second axis, wherein the solid state pivotal mechanism moves the plurality of read and write beams along the first axis; and
d) a lens/detection assembly, optically coupled to the directing lens and including (i) an angled beam splitter for directing the plurality of parallel read and write beams to the media for simultaneously reading multiple tracks of data therefrom or simultaneously writing multiple tracks of data thereto, and (ii) a diverging lens for directing a plurality of reflected beams received from the media to a photodetector.

12. A mass storage system, comprising:
a housing securing a media in a stationary position;
an optical head assembly generating at least one optical beam, the optical head assembly including a beam splitter and diffraction grating assembly for generating a plurality of parallel optical beams, wherein the plurality of parallel optical beams are individually modulated to represent digital data to be stored on the media;
a beam positioning mechanism causing the at least one optical beam to impinge on the media; and
means for changing a position of at least one of the optical head assembly and beam positioning mechanism such that the optical beam is scanned over the media.

13. The mass storage system according to claim 12, wherein the plurality of parallel optical beams represent one byte of digital data.

14. The mass storage system according to claim 12, wherein the media includes zones for at least one of random access and archival storage.

15. The mass storage system according to claim 14, wherein the media includes zones for both random access and archival storage and data can be transferred between the zones for random access and archival storage.

16. The mass storage system according to claim 12, wherein the stored digital data is read out from the media and formatted to at least one of serial data and parallel data.

17. The mass storage system according to claim 12, wherein the beam positioning mechanism includes at least one of an angled beam splitter and parabolic beam splitter to impinge the at least one optical beam on the media.

18. The mass storage system according to claim 12, wherein the beam positioning mechanism includes at least one of an angled beam splitter and parabolic beam splitter for causing the plurality of parallel beams to impinge on the media.

19. A mass storage system, comprising:
a housing securing a media in a stationary position;
an optical head assembly generating at least one optical beam, the optical head assembly including a beam splitter and diffraction grating assembly for generating a plurality of parallel optical beams, wherein the plurality of parallel optical beams are individually modulated to represent digital data to be stored on the media;
a beam positioning mechanism causing the at least one optical beam to impinge on the media; and
a pivot mechanism changing a position of the optical head assembly such that the optical beam is scanned over the media.

20. The mass storage system according to claim 19, wherein the plurality of parallel optical beams represent one byte of digital data.

21. The mass storage system according to claim 19, wherein the media includes zones for at least one of random access and archival storage.

22. The mass storage system according to claim 21, wherein the media includes zones for both random access and archival storage and data can be transferred between the zones for random access and archival storage.

23. The mass storage system according to claim 19, wherein the stored digital data is read out from the media and formatted to at least one of serial data and parallel data.

24. The mass storage system according to claim 19, wherein the beam positioning mechanism includes at least one of an angled beam splitter and parabolic beam splitter to impinge the at least one optical beam on the media.

25. The mass storage system according to claim 19, wherein the beam positioning mechanism includes at least one of an angled beam splitter and parabolic beam splitter for causing the plurality of parallel beams to impinge on the media.

26. A mass storage system, comprising:
housing means for securing a media in a stationary position;
optical head means for generating at least one optical beam, the optical head means including a beam splitter and diffraction grating assembly for generating a plurality of parallel optical beams, wherein the plurality of parallel optical beams are individually modulated to represent digital data to be stored on the media;
means for impinging the optical beam on the media; and
means for changing a position of the optical head means for scanning the optical beam over the media.

27. The mass storage system according to claim 26, wherein the plurality of parallel optical beams represent one byte of digital data.

28. The mass storage system according to claim 26, wherein the media includes zones for at least one of random access and archival storage.

29. The mass storage system according to claim 28, wherein data can be transferred between the zones for random access and archival storage.

30. The mass storage system according to claim 26, wherein the stored digital data is read out from the media and formatted to at least one of serial data and parallel data.

31. The mass storage system according to claim 26, wherein the means for impinging the optical beam includes at least one of an angled beam splitting means and parabolic beam splitting means for impinging the at least one optical beam on the media.

32. The mass storage system according to claim 26, wherein the mean for impinging the optical beam includes at least one of an angled beam splitting means and parabolic beam splitting means for impinging the plurality of parallel beams on the media.

33. A method for recording to and reproducing data from a stationary media, comprising the steps of:

generating at one least optical beam in an optical head including substeps of splitting an optical beam into a plurality of parallel optical beams and individually modulating the plurality of parallel optical beams to represent digital data to be stored on the media;

impinging the optical beam on the stationary media through a beam positioning mechanism; and changing a position of at least one of the optical head and beam positioning mechanism such that the optical beam is scanned over the media.

34. The method of claim 33, wherein the plurality of parallel optical beams represent one byte of digital data.

35. The method of claim 34, wherein the media includes zones for at least one of random access and archival storage.

36. The method of claim 35, wherein the media includes zones for both random access and archival storage and further comprising the step of transferring data between the zones for random access and archival storage.

37. The method of claim 33, further comprising the steps of reading out the stored digital data from the media and formatting the read digital data to at least one of serial data and parallel data.

* * * * *